United States Patent
Ford et al.

(10) Patent No.: US 9,635,486 B2
(45) Date of Patent: Apr. 25, 2017

(54) NETWORK SELECTION FOR A GIVEN APPLICATION OR CONTEXT

(71) Applicant: MICROSOFT TECHNOLOGY LICENSING, LLC, Redmond, WA (US)

(72) Inventors: Brent Ford, Sammamish, WA (US); Issa Khoury, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 14/301,164

(22) Filed: Jun. 10, 2014

(65) Prior Publication Data

US 2015/0358757 A1 Dec. 10, 2015

(51) Int. Cl.
*H04W 4/00* (2009.01)
*H04L 29/08* (2006.01)
*H04W 48/18* (2009.01)

(52) U.S. Cl.
CPC ............ *H04W 4/001* (2013.01); *H04L 67/36* (2013.01); *H04W 48/18* (2013.01)

(58) Field of Classification Search
CPC ............................. H04W 4/001; H04L 67/36
USPC ......................................................... 455/418
See application file for complete search history.

(56) References Cited

U.S. PATENT DOCUMENTS

| | | | |
|---|---|---|---|
| 8,848,608 B1* | 9/2014 | Addepalli et al. | 370/328 |
| 2010/0144332 A1* | 6/2010 | Savoor | 455/418 |
| 2011/0275344 A1* | 11/2011 | Momtahan et al. | 455/405 |
| 2012/0108225 A1 | 5/2012 | Luna et al. | |
| 2012/0327912 A1 | 12/2012 | Kirveskoski | |

(Continued)

FOREIGN PATENT DOCUMENTS

WO 2013112642 A2 8/2013

OTHER PUBLICATIONS

Mohan, et al., "A Novel Algorithm for the Optimal Network Selection Scheme in the User Centric 4G Networks", In Journal of International Computer Applications vol. 61, Jan. 2013, (4 pages total).

(Continued)

*Primary Examiner* — Michael Neff
(74) *Attorney, Agent, or Firm* — Karin L. Williams; Mayer & Williams PC

(57) ABSTRACT

A network usage manager in an operating system executing on a mobile device is configured to enable selection among different cellular data connections by application ("app") or by app class so that end users can tailor cellular network allocation, app performance, and costs to meet their specific needs while mobile operators can improve network utilization and provide more comprehensive data plan offerings. The network usage manager applies app usage policies to select among different cellular data connections which may be supported on the mobile device using single or multiple SIM/UICC (Subscriber Identity Module/Universal Integrated Circuit Card) cards. The app usage policies can be set for a given app or class of app on the mobile device so that, for example, apps that implement background synchronization processes can use typically less expensive, lower bandwidth connections while typically more expensive, higher bandwidth connections are selected for data intensive apps.

15 Claims, 19 Drawing Sheets

(56) References Cited

U.S. PATENT DOCUMENTS

| | | |
|---|---|---|
| 2013/0114504 A1 | 5/2013 | Zhao |
| 2013/0122910 A1 | 5/2013 | Singh et al. |
| 2013/0142043 A1 | 6/2013 | Tapia et al. |
| 2013/0267216 A1 | 10/2013 | Brisebois et al. |
| 2013/0304616 A1 | 11/2013 | Raleigh et al. |
| 2013/0315146 A1 | 11/2013 | Vangala et al. |
| 2014/0071895 A1* | 3/2014 | Bane et al. ............... 370/328 |
| 2014/0086177 A1 | 3/2014 | Adjakple et al. |
| 2014/0337528 A1* | 11/2014 | Barton et al. ............ 709/225 |
| 2015/0222641 A1* | 8/2015 | Lu ........................ G06F 21/57 726/1 |
| 2015/0341484 A1* | 11/2015 | Yablokov .......... H04M 1/72577 455/410 |

OTHER PUBLICATIONS

"International Search Report & Written Opinion Issued in PCT Application No. PCT/US2015/034766", Mailed Date: Sep. 9, 2015, (11 pages total).

"Second Written Opinion Issued in PCT Application No. PCT/US2015/034766", Mailed Date: Dec. 22, 2015, (7 pages total).

\* cited by examiner

NETWORK SELECTION FOR A GIVEN APPLICATION OR CONTEXT

BACKGROUND

Application and data usage is common on smartphones, tablets, and other mobile devices today. Given the typically higher cost of cellular data and the increasing prevalence of Wi-Fi under IEEE 802.11, many mobile device operating systems allow a user to set policies so that certain applications or classes of applications only work over a Wi-Fi connection. While such systems can perform satisfactorily in many usage scenarios, additional flexibility and features are desirable.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A network usage manager in an operating system executing on a mobile device is configured to enable selection among different data connections by application ("app") or by app class so that end users can tailor cellular network allocation, app performance, and costs to meet their specific needs while mobile operators can improve network utilization and/or yield management and provide more comprehensive data plan offerings. The network usage manager applies app usage policies to select among different data connections which may be supported on the mobile device using single or multiple SIM/UICC (Subscriber Identity Module/Universal Integrated Circuit Card) cards including real, embedded, virtual, or soft SIMs. The app usage policies can be set for a given app or class of app on the mobile device so that, for example, apps that implement background synchronization processes like email and social network feeds, etc. can use typically less expensive, lower bandwidth connections while typically more expensive, higher bandwidth connections are selected for data intensive apps like streaming media apps and other apps that operate in realtime. App usage policies may also be applied, for example, so that job-related/enterprise apps use one connection for data access (e.g., a fast connection that is subject to data limits, caps, throttling, etc.) while personal apps use another connection for data access (e.g., a slow connection that is unlimited).

In various illustrative examples, the app usage policies can be generated and applied using manual, semi-automatic, and/or automatic implementations. App usage policies can also be applied in scenarios in which a mobile device is tethered to a companion device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
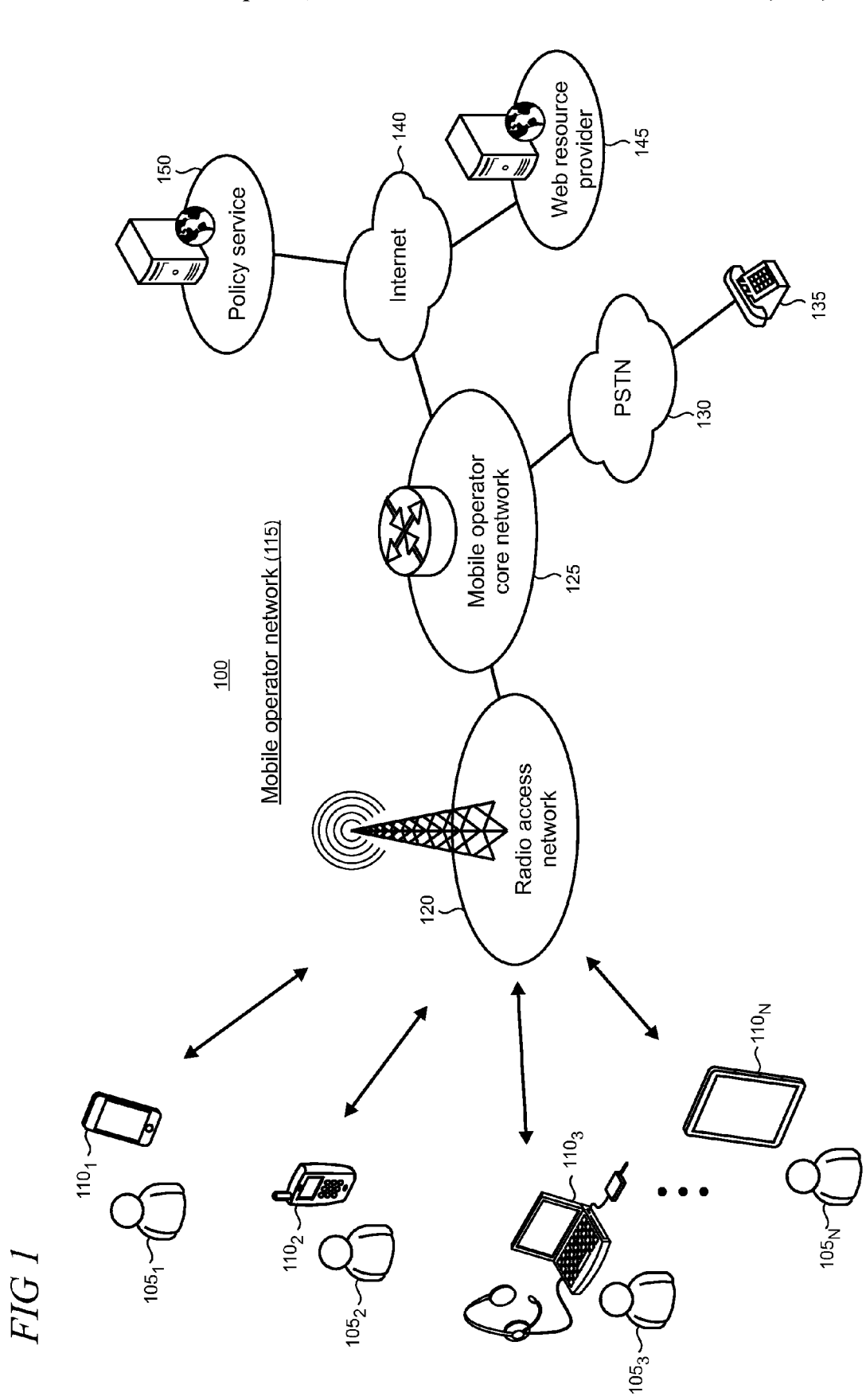
FIG. 1 shows an illustrative telecommunications environment in which mobile devices interact with a mobile operator (MO) network.

FIG. 1 shows an illustrative telecommunications environment 100 in which various users 105 employ respective devices 110 that communicate over a mobile operator (MO) network 115. The devices 110 can often provide voice telephony capabilities and typically support data-consuming applications such as Internet browsing and multimedia (e.g., music, video, etc.) rendering in addition to supporting various other features. The devices 110 may include, for example, user equipment, mobile phones, cell phones, and smartphones which users often employ to make and receive voice and/or multimedia calls, communicate using text and multimedia, run various apps, and access websites and other resources.

However, alternative types of electronic devices are also envisioned to be usable within the telecommunications environment 100 so long as they are configured with data capabilities and can connect to the MO network 115. Such alternative devices variously include handheld computing devices, PDAs (Personal Digital Assistants), portable media players, wearable computers, navigation devices such as GPS (Global Positioning System) systems, laptop PCs (personal computers) desktop computers, tablet computers, phablet computers (devices that combine or straddle various functions provided by phones and tablets), feature phones, multimedia consoles, gaming systems, or the like. In the discussion that follows, the use of the term "mobile device" is intended to cover all devices that are configured with data capabilities and may implement wireless connectivity to a data access network such as the MO network 115.

Each mobile device 110 will typically have a prearranged association with the MO network 115. For example, a user 105 will typically be a subscriber to a cellular data plan so that the user's mobile device 110 can access the MO network as valid and authenticated user equipment. The MO network 115 typically includes a radio access network 120 having a number of macrocells that support access by the devices 110 to a mobile operator core network 125. The backend of the MO network 115 generally includes interfaces that support a connection to network infrastructure including a public switched telephone network (PSTN) 130 so that communication is enabled between the mobile device 110 and conventional wireline user equipment 135. A connection to the Internet 140 is also typically supported so that the mobile devices 110 can access various web resource providers 145. A policy service 150 is also accessible to the mobile devices through the MO network 115, as described in more detail below. It is emphasized that while a conventional MO is shown in the environment 100 in this illustrative example, it is contemplated that any of a variety of network types other than cellular may be utilized to support data access by the mobile devices to facilitate practice of the present network selection for a given app or context and its various embodiments as described below. For example, such alternative network types may include Wi-Fi networks, IP TCP/IP-based (Transport Control Protocol/Internet Protocol) networks, White Space networks, short-range wireless networks such as Bluetooth, networks using RF (radio frequency) transport and/or signaling, other communication networks supporting data access by the mobile devices 110, and various combinations and sub-combinations of such network types. As long as multiple data connections are available to a given device, the present network selection can be expected to be adapted for use with any type of network data transport provided by a service provider (and including providers other than MOs) and thus may be generally viewed as being network/transport agnostic.

Figure 2:
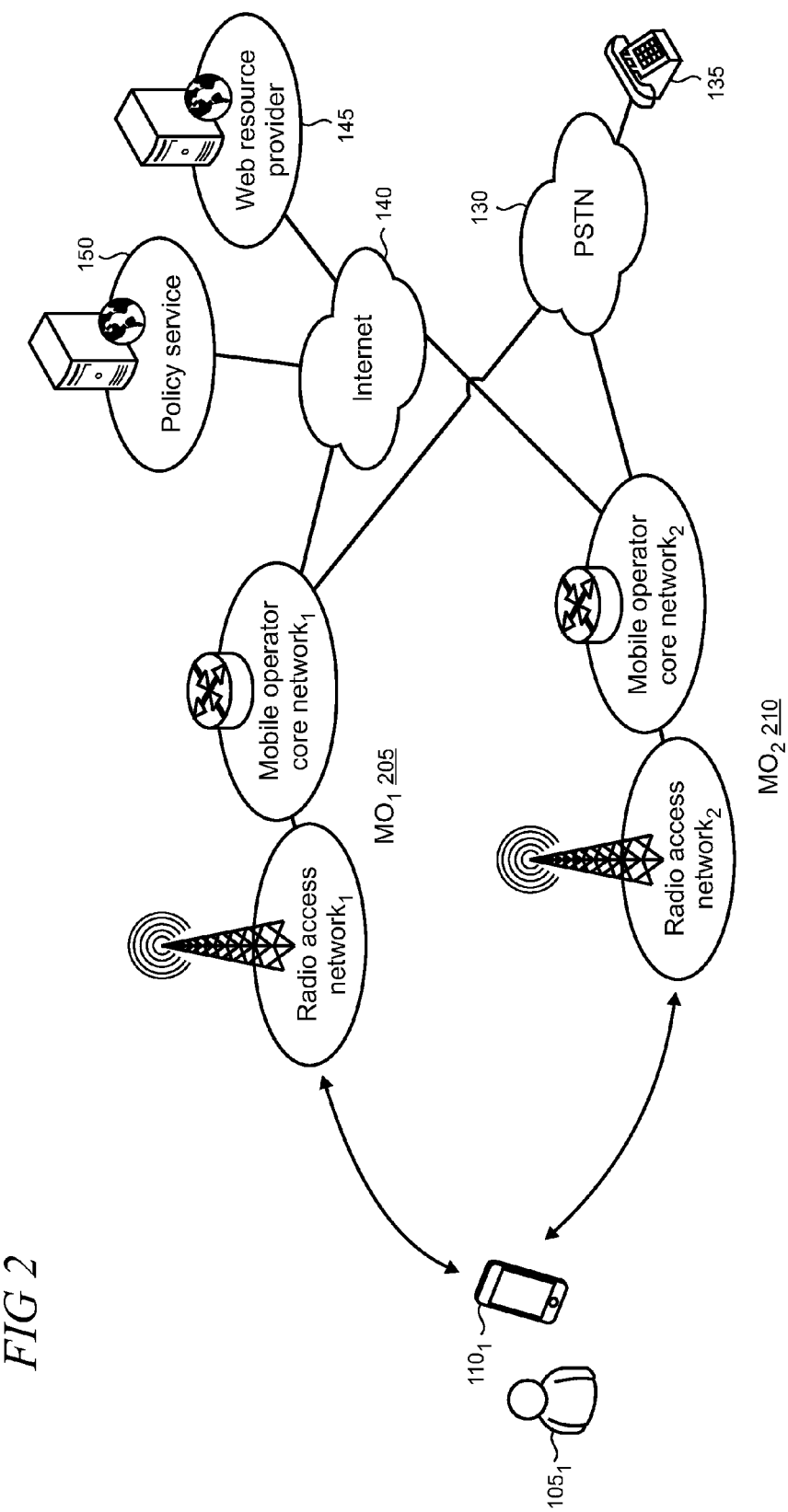
FIG. 2 shows an illustrative environment in which a mobile device is configured for connections to multiple MO networks.

In some cases a given mobile device may have capabilities to access different MO networks as shown in FIG. 2. Here, a mobile device 110 can connect to either $MO_1$ 205 or $MO_2$ 210. The MO networks can have similar capabilities or be different, for example by having different data network characteristics where one MO may support 2G capabilities while the other MO may support more advanced features under 4G LTE (Fourth Generation, Long Term Evolution). Both 2G and 4G LTE are described by 3GPP (Third Generation Partnership Project).

Figure 3:
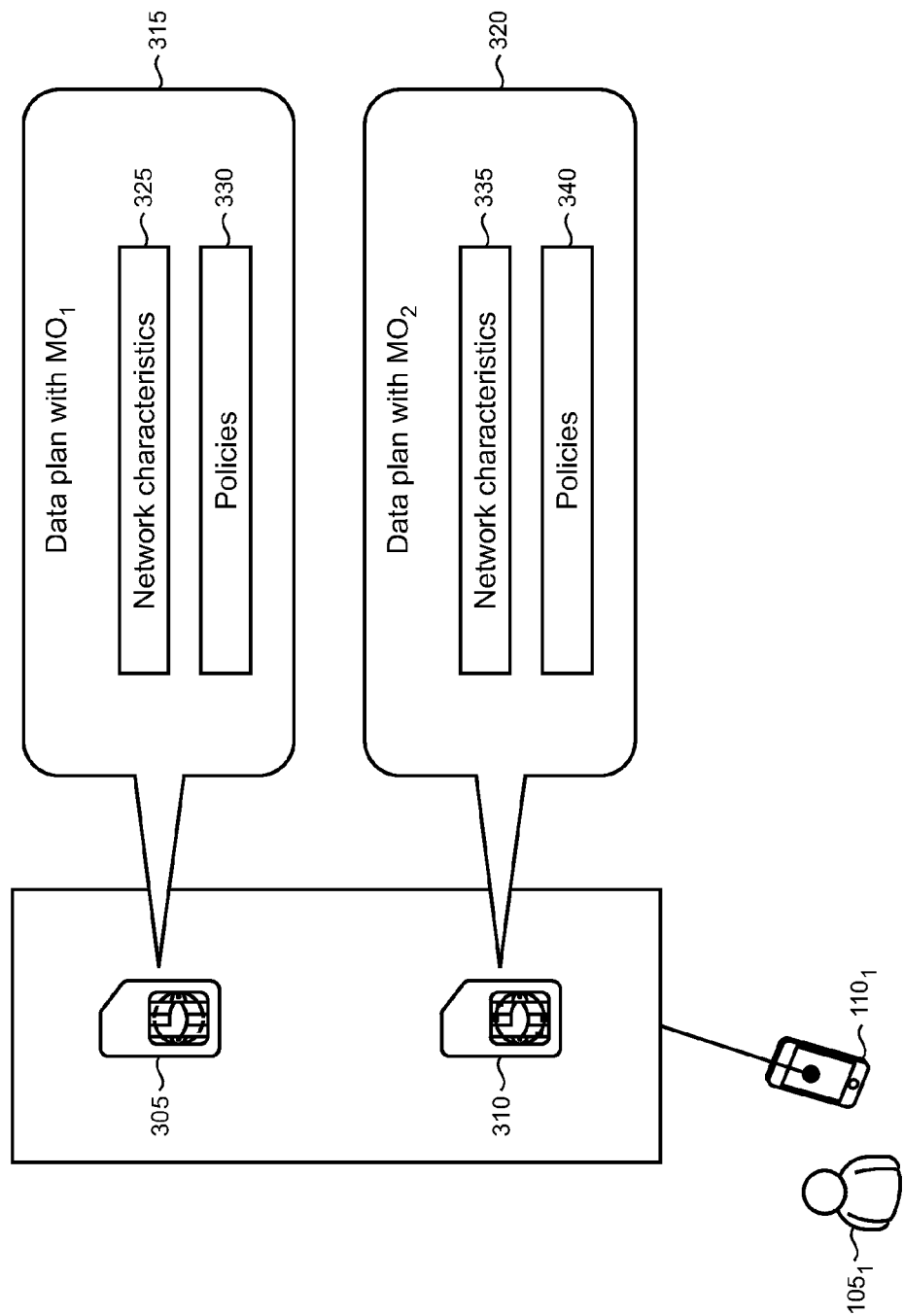
FIG. 3 shows a mobile device supporting multiple SIMs associated with data plans with different MOs.

Such capability for multiple MO network connections can be supported in the mobile device 110, for example, by using multiple SIM or UICC cards (collectively referred to as "SIMs" in the description that follows), as shown in FIG. 3. The mobile device 110 in this example uses two SIMs as indicated by reference numerals 305 and 310. Each SIM enables authentication and access to a particular MO. In this illustrative example, SIM 305 is associated with a data plan 315 provided by $MO_1$ and SIM 310 is associated with a data plan 320 provided by $MO_2$.

Each of the data plans can be described by respective network characteristics and policies. For example, data plan 315 may have network characteristics 325 that include 2G speeds and policies 330 that enable the user 105 to access an unlimited amount of data at that speed over some given time period such as a monthly billing period. In contrast, data plan 320 may have network characteristics 335 that include both 4G LTE and 2G speeds and policies 340 that provide a limited amount of data access at the higher 4G LTE speeds and then additional data access at the lower 2G speeds. For example, under the data plan 320, the user 105 may get 2 gigabytes of data access at 4G LTE speeds but then be throttled down to the lower 2G speeds for access beyond 2 gigabytes per billing cycle.

It is emphasized that the data plan policies described in this example are intended to be illustrative and that various other types of policies may be utilized including data allotments and limits, data delivery at various speeds and quality of service (QoS), time of day restrictions, and the like. In many cases, the faster data connections may be viewed by the user as being more "expensive" because the faster connection is limited by MO policies in some way or is perceived as more scarce, or is, in fact, billed at a higher rate or subject to additional charges (e.g., some dollar amount per megabyte, or some dollar amount per megabyte beyond a fixed monthly allotment).

Figure 4:
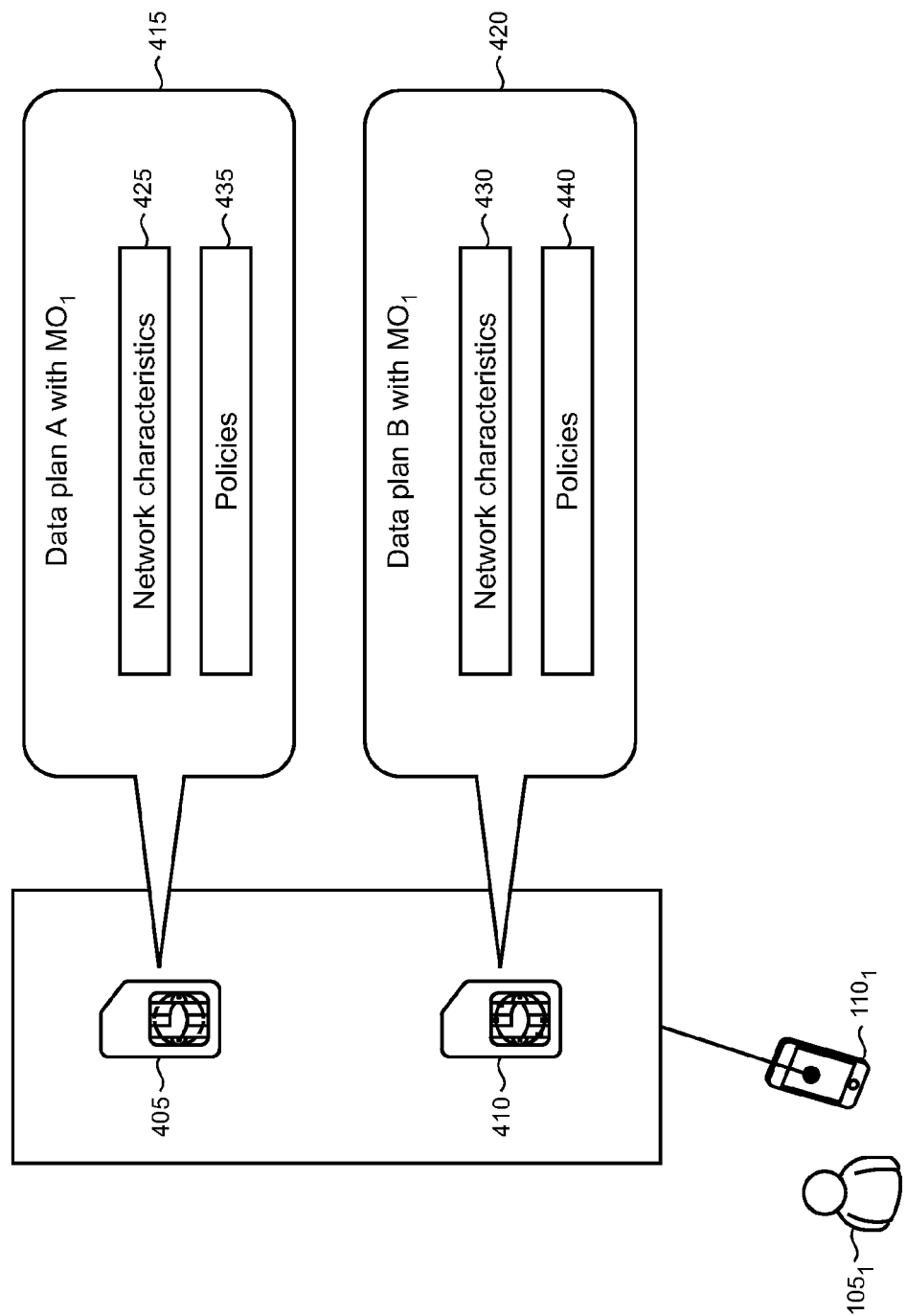
FIG. 4 shows a mobile device supporting multiple SIMs associated with data plans with the same MO.

In some scenarios, an individual user may have an identity that is associated with both SIMs and their respective data plans. For example, a single user might have one subscriber account with $MO_1$ 205 and another separate subscriber account with $MO_2$ 210. In another scenario as shown in FIG. 4, a single subscriber has two subscriber accounts with the same MO using SIMs 405 and 410. Each data plan may have its own network characteristics, as respectively indicated by reference numerals 425 and 430. Each data plan may also have its own policies, as respectively indicated by reference numerals 435 and 440. Such arrangement typically provides two separate telephone numbers with associated data plans 415 and 420 that utilize a common physical handset. Two different subscriber accounts could also be associated with the SIMs installed on a given mobile device. For example, one of the SIMs could be associated with the user's personal account with an MO, while the other SIM could be associated with a subscriber account with the user's employer (in which the MOs for the personal and work accounts could be the same or different).

Figure 5:
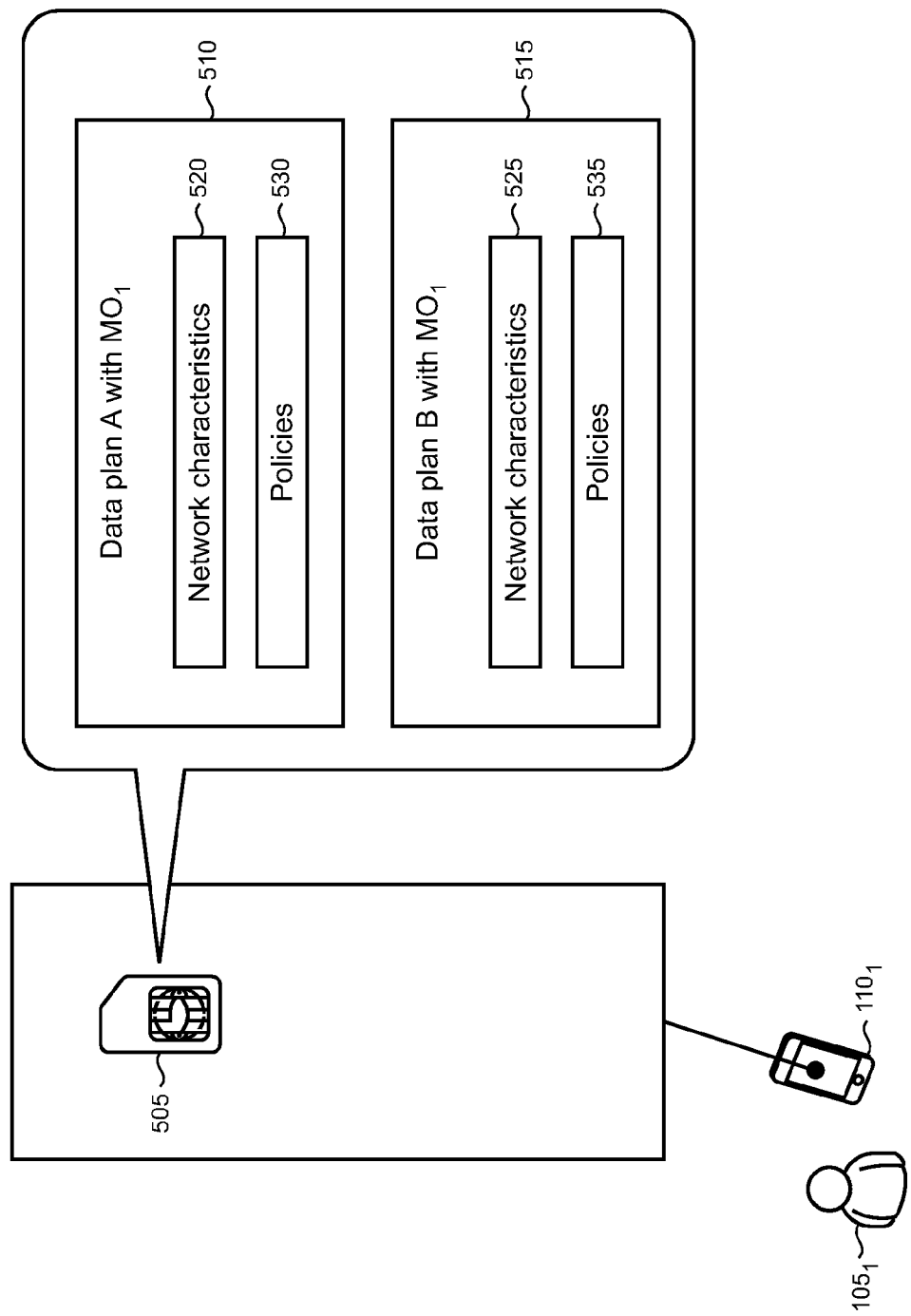
FIG. 5 shows a mobile device supporting a single SIM associated with multiple data plans with the same MO.

FIG. 5 shows another scenario in which multiple data plans can be supported. In this scenario, a single SIM 505 supports a data connection with the single $MO_1$, but $MO_1$ provides multiple data plans: data plan A 510 and data plan B 515, as shown. Each data plan may have its own network characteristics, as respectively indicated by reference numerals 520 and 525 and policies, as respectively indicated by reference numerals 530 and 535. The data plans A and B can be associated with different subscriber accounts/identities and/or be separately billed by the single MO in some cases.

Figure 6:
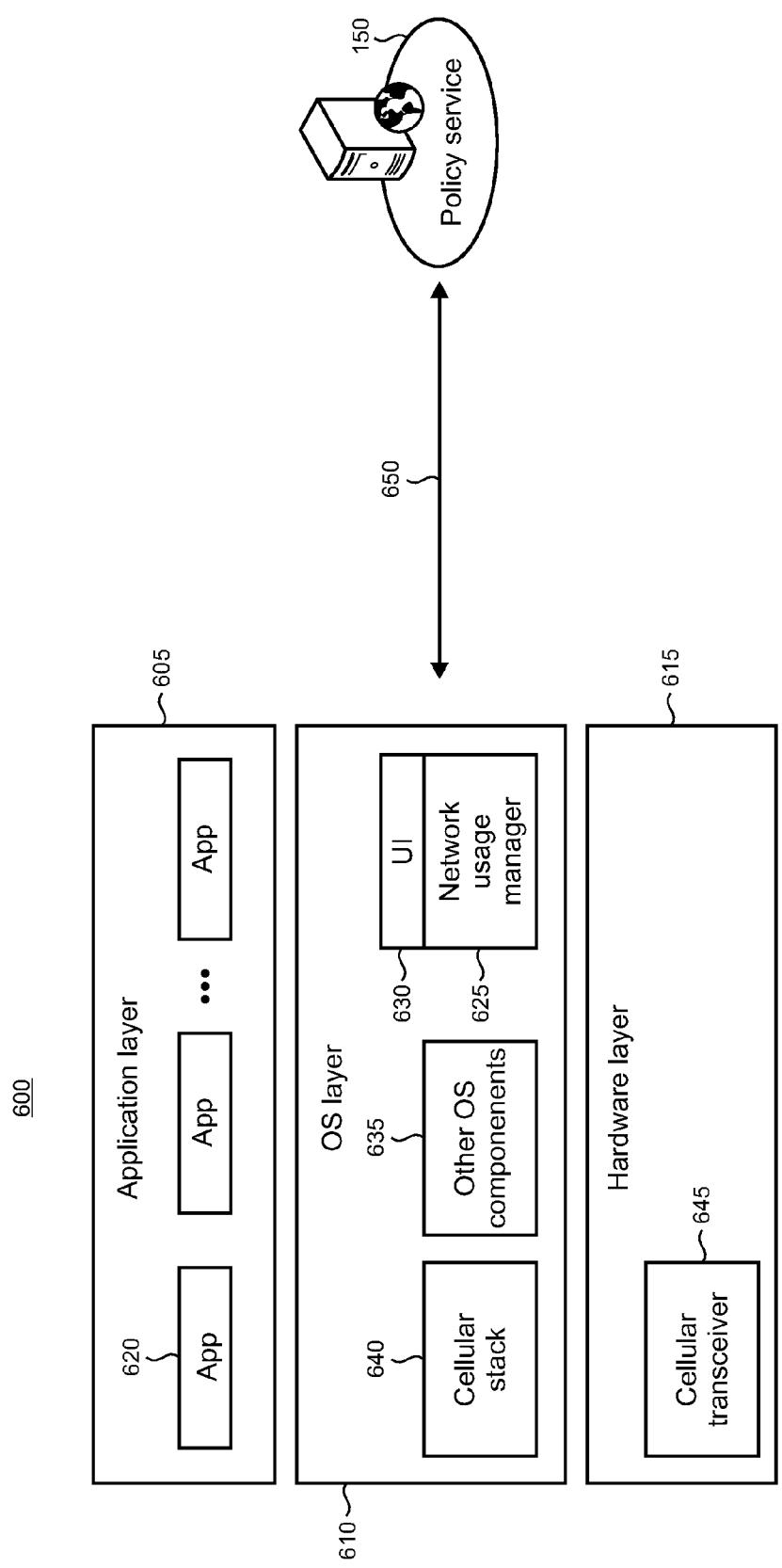
FIG. 6 shows an illustrative architecture of functional components that may be utilized on a mobile device.

As shown in FIG. 6, a mobile device 110 may support a layered architecture 600 of functional components. The architecture 600 is typically implemented in software, although combinations of software, firmware, and/or hardware may also be utilized in some cases. The architecture 600 is arranged in layers and includes an application layer 605, an OS (operating system) layer 610, and a hardware layer 615. The hardware layer 615 provides an abstraction of the various hardware used by the mobile device 110 (e.g., input and output devices, networking hardware, etc.) to the layers above it.

The application layer 605 in this illustrative example supports various apps 620 that may be utilized to perform any of a variety of functions and support various features. The apps 620 are often implemented using locally executing code. However, in some cases the apps may rely on services and/or remote code execution provided by remote servers or other computing platforms such as those supported by external service providers. An app 620 may also utilize other code, methods, and/or resources that are provided by functional components located in the OS layer 610 and/or hardware layer 615.

A network usage manager 625 is instantiated in the OS layer 610 and exposes a user interface (UI) 630 to support interactions with the mobile device user 105 (FIG. 1). Other OS components 635 and a cellular stack 640 are also typically supported in the OS layer 610, as shown. The cellular stack 640 is configured for interoperability with a cellular transceiver 645 in the hardware layer 615 so that the mobile device 110 is able to support telephony and data access features and communicate over a radio link with an MO network using appropriate protocols. While the architecture 600 is shown with components that support cellular communications, it will be appreciated that other components (not shown) may also be included in the architecture to support communications with other network types and using other appropriate protocols (e.g., Wi-Fi, White Space, etc.).

As described in more detail below, the network usage manager 625 is configured for communication with the remote policy service 150 as indicated by line 650. In some implementations, other components in the OS, application, and hardware layers may also interoperate with the remote policy service 150 or other external providers or resources. While the policy service 150 is implemented in this illustrative example as a remote, cloud-based service, in alternative embodiments the policy service 150 may be supported in whole or part by network elements that reside in an MO network.

Figure 7:
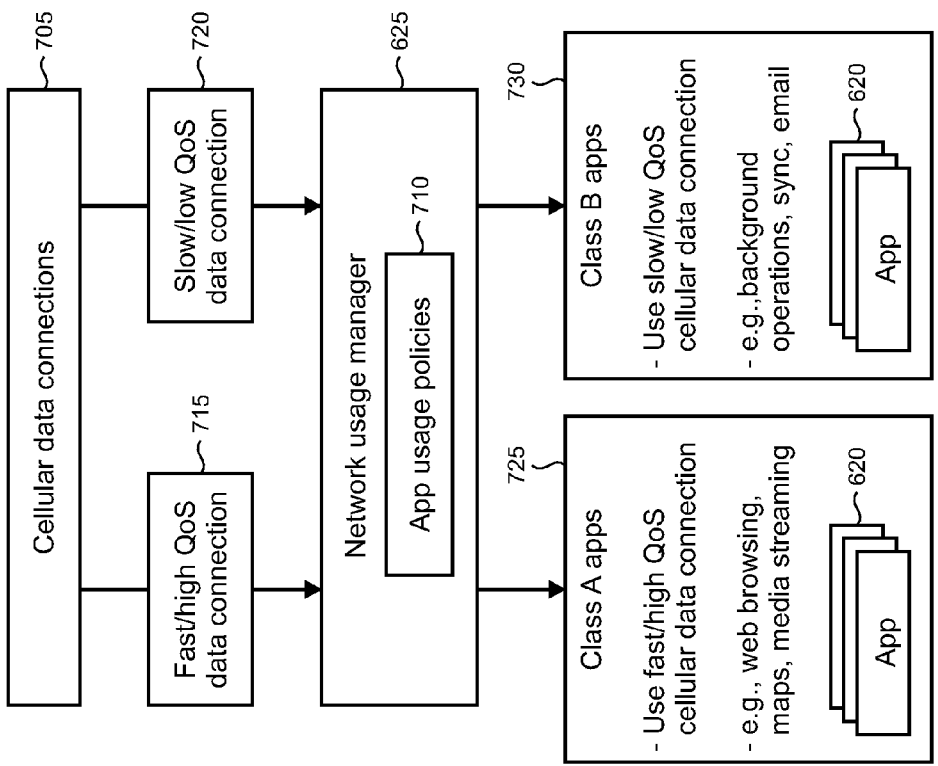
FIG. 7 shows an arrangement in which a network usage manager selects among different cellular data connections for different applications (apps) or classes of apps.

As shown in FIG. 7, the network usage manager 625 is arranged to select among multiple cellular data connections 705 that are available to the mobile device 110 and map a selected connection to individual apps or classes of apps according to app usage policies 710. For example, the cellular data connections can be supported by different MOs as shown in FIG. 2. In other scenarios, the multiple cellular connections may be supported by a single MO as shown in FIG. 5. In typical implementations, the cellular data connections 705 include a connection 715 that is characterized by being comparatively fast with a high QoS, while connection 720 is characterized by being comparatively slow with a low QoS. Accordingly, the fast/high QoS connection 715 could be a 4G LTE connection while the slow/low QoS connection 720 could be a 2, 2.5, or 3G connection, for example.

As shown, one class of apps (Class A apps 725) uses the fast/high QoS cellular data connection. Illustrative examples of apps that typically fall within this class include web browsing, maps, and media streaming which tend to provide a more optimal user experience using faster data connections. Another class of apps (Class B apps 730) uses the slow/low QoS cellular data connections. Illustrative examples of apps that typically fall within this class include apps that employ processes that operate in the background, apps using synchronization methods, email, and other apps that do not necessarily access data in support of real-time user experiences. It is emphasized that the exposition of these app classes and their typical members is intended to be illustrative and that other class types and class members can be utilized to meet the needs of a particular implementation.

Figure 8:
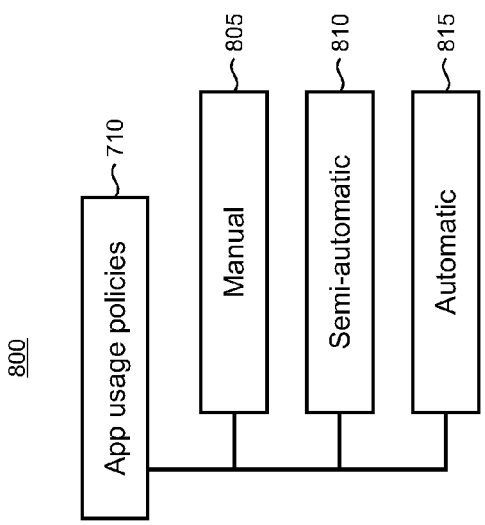
FIG. 8 shows a taxonomy of illustrative implementations for app usage policies.
Figure 9:
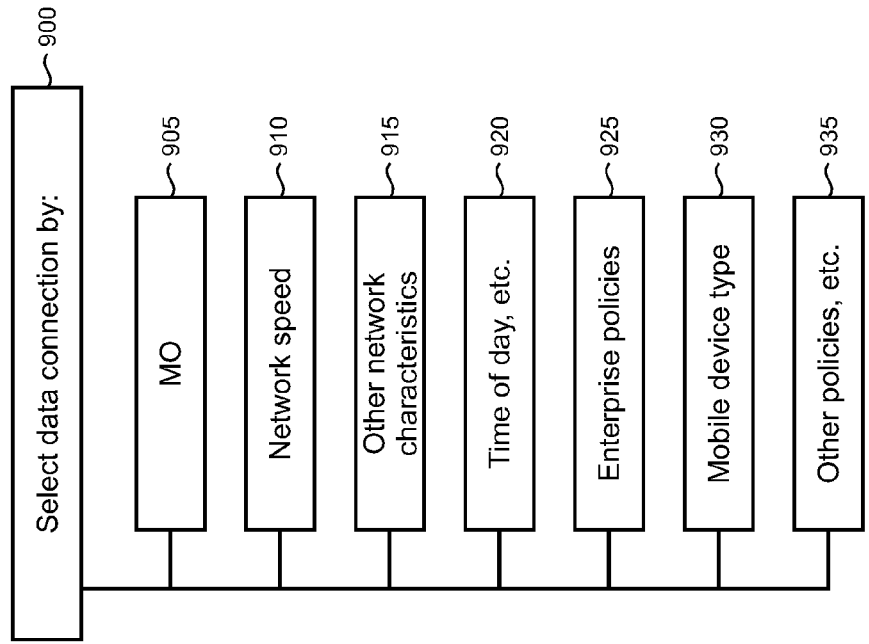
FIG. 9 shows illustrative data connection selection criteria.

FIG. 8 shows an illustrative taxonomy 800 of options for implementing the app usage policies 710. Manual, semi-automatic, and automatic implementations are supported as respectively indicated by reference numerals 805, 810, and 815. With the manual implementation 805, using the UI 630 (FIG. 6), the user can pick which of the available data connections the network usage manager 625 selects for use for each app or category of apps when accessing data. For example as shown in the selection criteria taxonomy 900 in FIG. 9, the selection can be made: by mobile operator 905 (e.g., $MO_1$ or $MO_2$); by network speed 910 (e.g., lower speed 2G network, or higher speed 3G network, or current 4G LTE network); by other network characteristics 915 (e.g., congestion, applicability of data throttling under some conditions, etc.); by the time of day 920 (or day of month or other calendar period, etc.); by applicable enterprise policies 925 (e.g., restrictions on access to certain content, policies covering use of corporate assets, etc.); by device type and/or brand and/or enabled feature-set (e.g., smartphone, tablet, wearable, tethered/un-tethered, etc.) 930 or; by other policies, preferences, guidelines, or rules 935.

Figure 10:
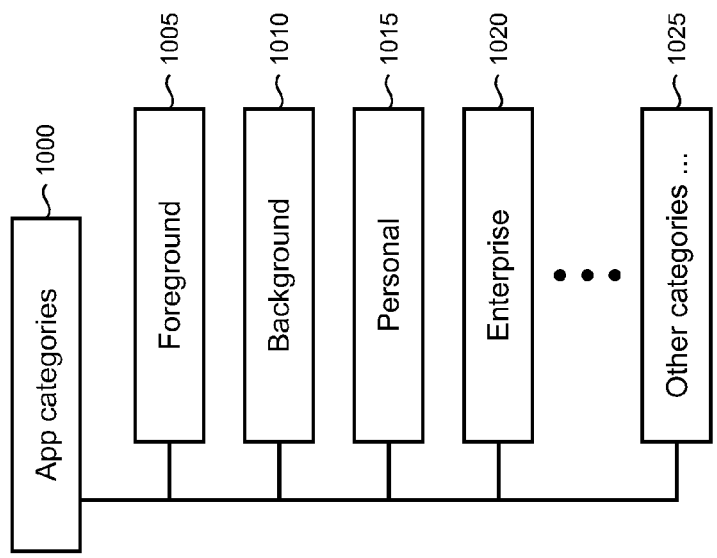
FIG. 10 shows a taxonomy of illustrative app categories.

One or more criteria may be utilized in various combinations. In addition, the user could set the app usage policies so that apps falling into a certain category or which meet other criteria are handled in specific ways. FIG. 10 illustrates some exemplary categories 1000 of apps including foreground 1005, background 1010, personal 1015, and enterprise 1020 (i.e., work-related). Other categories 1025 may also be utilized depending on the needs of a particular implementation.

In illustrative examples, all of the user's apps that are used during the week for job-related activities could be set to adhere to a usage policy so that those apps use a connection under a data plan that is paid for by the employer. The user could also decide to set a usage policy so that a web browser app, for example, ordinarily uses a high speed data connection, except at certain times of day when higher data connection rates might be applicable or when network congestion is normally experienced, in which case a lower speed, but less congested, connection is utilized. When an app is launched and needs to access external resources or content, the network usage manager will select a data connection for use with that app in accordance with the app usage policies that reflect the user's settings.

In another illustrative example, the usage policies may be generated and applied in ways that make the app's user experiences more optimal by taking into account the type, brand, or feature-set of the device being used. Here, app usage policies can consider how device-specific factors such as screen size and battery capacity can affect a given app when selecting a data connection for it. For example, the app usage policies may be configured to select a fast/high QoS connection for streaming media apps that run on a tablet device where its larger/higher resolution screen is typically better supported with a higher bandwidth connection. On devices with smaller and/or low resolution screens, and/or low battery capacity, a slow/low QoS connection may be utilized, for example, with all apps having significant display usage (including streaming media apps) in accordance with the app usage policies in order to preserve resources while still providing a good on-screen user experience.

In another illustrative example, the usage policies may be generated and applied in ways that make the app's user experiences more optimal across mobile devices. Here, the policy service 150 can take into account multiple mobile devices that may be associated with a single user or enterprise so that user experiences when accessing mobile data is consistent no matter which particular device is being used at a given moment. For example, a user may have both smartphone and tablet devices used in conjunction with a job that are each subject to some enterprise policies that can be applied by the network usage manager 625 when selecting a connection when an app needs to access data. Or, a user might have both a tablet computer and a wearable device for personal use in which app usage policies are applied so that a streaming music app running on each always connects to a fast/high QoS to ensure that the user experiences for that app are consistent across the different devices.

Returning again to FIG. 8, with the semi-automatic implementation 810, the policy service 150 (FIG. 1) provides app usage policies to the network usage manager 625 based, for example, on the installed apps on the device, user-provided data, and/or other contextual information. Typically with notice to the user and user consent, the semi-automatic implementation may initiate a component in the OS that periodically surveys the identities of the apps that are installed and used on the mobile device. The survey information may be sent to the policy service 150 over a data connection which categorizes the installed apps and creates app usage policies 710.

For example, the policy service 150 can place a given app into the foreground category based on its known behaviors and characteristics and then assign a usage policy so that the network usage manager 625 selects a fast/high QoS data connection for all apps that are categorized as foreground apps. That is, apps in the foreground category can be considered Class A apps as shown in FIG. 7. In another example, the policy service 150 may place an app into the background category and assign a usage policy so that the network usage manager 625 selects a slow/low QoS data connection for all apps that are categorized as background apps. That is, apps in the background category can be considered Class B apps as shown in FIG. 7.

The app usage policies 710 generated by the policy service 150 in the semi-automatic implementation are ingested by the network usage manager 625 (FIG. 6) for later application locally on the mobile device 110. The app usage policies may be periodically revised and/or updated by the policy service 150, for example, in response to changes in installed apps, input from the user, or other changes in context. The app usage policies 710 generated by the policy service 150 may be surfaced through the UI as recommendations which can then be accepted as is by the user, or manually adjusted if desired.

With the automatic method, the remote policy service 150 can automatically generate the app usage policies with comparatively little or no active input from the mobile device user. For example, with notice to the user and user consent, the policy service can collect app usage patterns and user behaviors over time. The policy service may also obtain data plan policies and information from the MOs in some cases and then use the collected data and information in various combinations to generate app usage policies that are more specifically tailored to the user's needs. For example, the app usage policies can be applied by the network usage manager in a manner that tends to optimize data connection selection to improve user experiences, improve app performance, and/or lower costs. The app usage policies generated by the policy service 150 in the automatic implementation are ingested by the network usage manager 625 and can be updated from time to time or as needed.

In each of the manual, semi-automatic, and automatic implementations, the network usage manager's selection of a data connection for a given app under an app usage policy can typically be overridden by the user through the UI 630 (FIG. 6) as desired. Thus, for example, the user may override a selection of a slow/low QoS connection for data access by an email app which would typically be categorized as a background app. In some scenarios, the user's override is effective for a single instance of access or a single session. In others, the UI can be configured to provide the user with options to persist the override for the app so that it uses the user's selected data connection for future data access. In some scenarios, user overrides can be disabled (entirely or selectively) so that a given app is always associated with a given data connection (i.e., the app is "locked" to the data connection). For example, app usage policies may specify a fast/high QoS connection always be selected for an app supporting a remote connection to an enterprise VPN (virtual private network) where such selection is not enabled for user-override.

Flowcharts that illustrate additional details about the app usage policies 710 (FIG. 7) are now presented. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Figure 11:
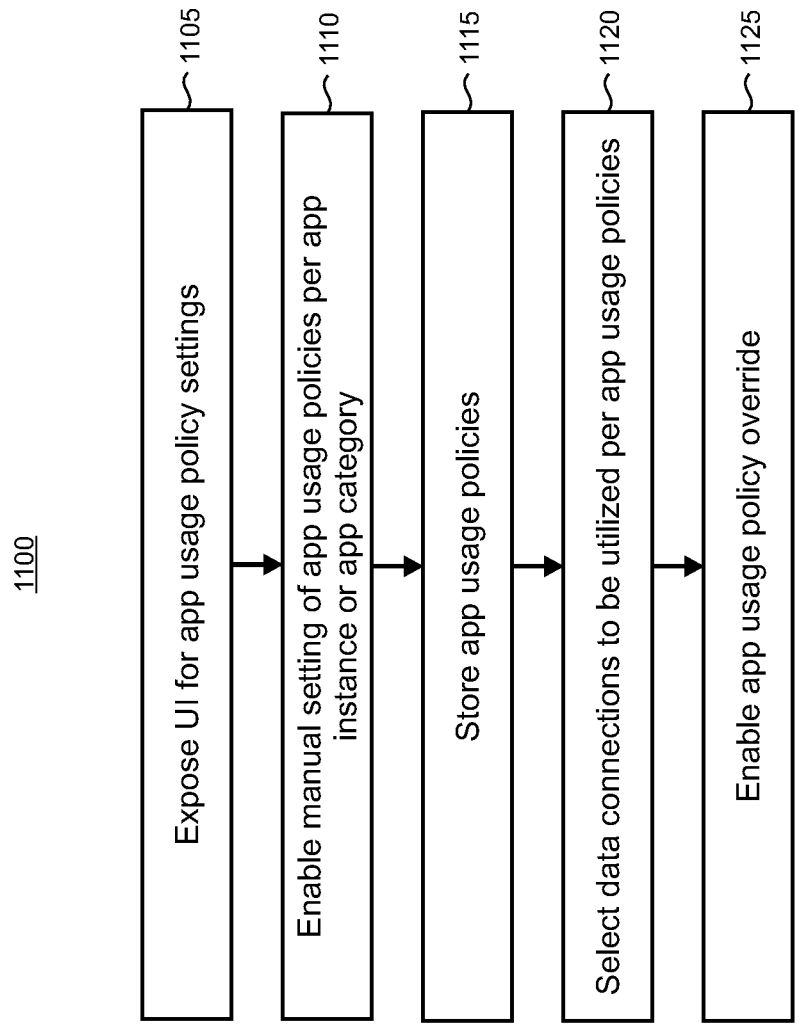
FIG. 11 is a flowchart of an illustrative method utilized by a mobile device in a manual implementation of app usage policies.

FIG. 11 shows an illustrative method 1100 that may be utilized at a mobile device 110 (FIG. 1) as part of the manual implementation of the app usage policies 710 (FIG. 7). In step 1105, the UI 630 (FIG. 6) is exposed to a user of the mobile device 110. The UI is configured to enable the user to manually set app usage policies in step 1110. The settings can be made on a per app basis, or according to app categories that the user can define and populate. Once set, the app usage policies can be stored in step 1115. Typically, the app usage policies are stored in a local memory or store on the mobile device 110, but in alternative implementations the settings can be stored remotely in a cloud-based store or service.

In step 1120, the network usage manager 625 (FIG. 6) applies the app usage policies 710 to select a data connection 705 for an app when the app needs data access. Instances of applications of the app usage policies 710 may be overridden by the user in step 1125. Thus, for example, the user may be provided with options on the UI in some cases to override the selection of data connection under the app usage policies when a given app needs data access. The options may also include, for example, enabling persistence of the user's override of data access for the app, and enabling suppression of the override feature so that the stored app usage policies are applied without further notification to the user of opportunities to override.

Figure 12:
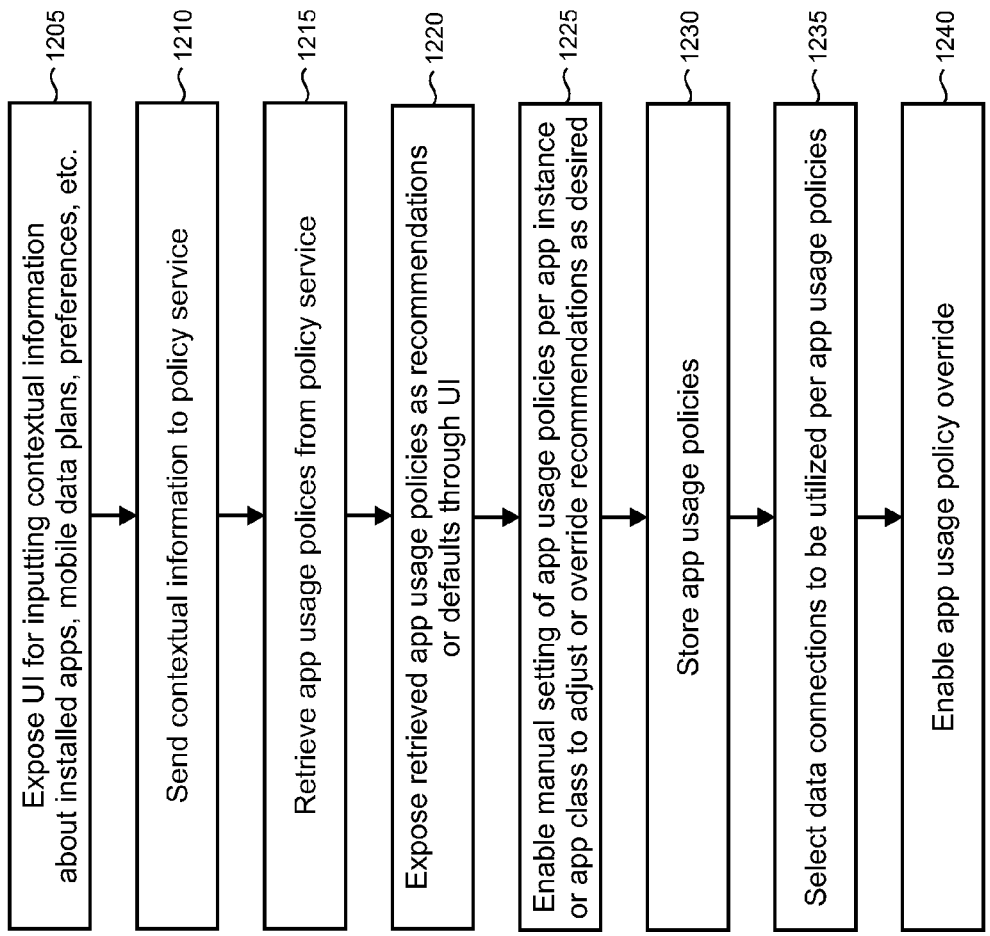
FIG. 12 is a flowchart of an illustrative method utilized by a mobile device in a semi-automatic implementation of app usage policies.

FIG. 12 shows an illustrative method 1200 that may be utilized at a mobile device 110 (FIG. 1) as part of the semi-automatic implementation of the app usage policies 710 (FIG. 7). In step 1205, the UI 630 (FIG. 6) is exposed to a user of the mobile device 110. The UI is configured to enable the user to provide some contextual information about one or more of the installed apps on the mobile device, the mobile data plans (e.g., data limits, plan policies, etc.), and user preferences. For example, the user may provide information on data limits, plan policies, etc., for each data plan associated with each connection. The user could also express a preference, for example, to use a lower speed connection for a certain app even though that app would ordinarily have sub-optimal performance at the lower connection speed.

The contextual information is provided to the policy service 150 (FIG. 1) in step 1210 over an MO network. Because communications with the policy service 150 are generally background processes, they will typically be implemented using a slow/low QoS connection. Steps 1205 and 1210 may be viewed as optional in some scenarios.

In step 1215, app usage policies are retrieved from the policy service 150 by the mobile device 110 and ingested. In step 1220, the retrieved app usage policies can be exposed to the user through the UI 630 as recommendations or default settings. For example, the recommendations can show lists or categories of installed apps and which of the available data connections is selected for each list or category. The user can interact with the UI to accept the recommendations or manually adjust or override them as desired in step 1225. Alternatively, the user can interact with the UI to change or define new categories and populate the categories with apps and select among available data connections. The app usage policies are stored in step 1230. As with the manual implementation, storage may be implemented in a local memory or store on the mobile device 110, but may also be implemented remotely using a cloud-based store or service. In step 1235, the network usage manager 625 (FIG. 6) applies the app usage policies 710 to select a data connection 705 for an app when the app needs data access. Instances of application of the app usage policies 710 may be overridden by the user in step 1240.

Figure 13:
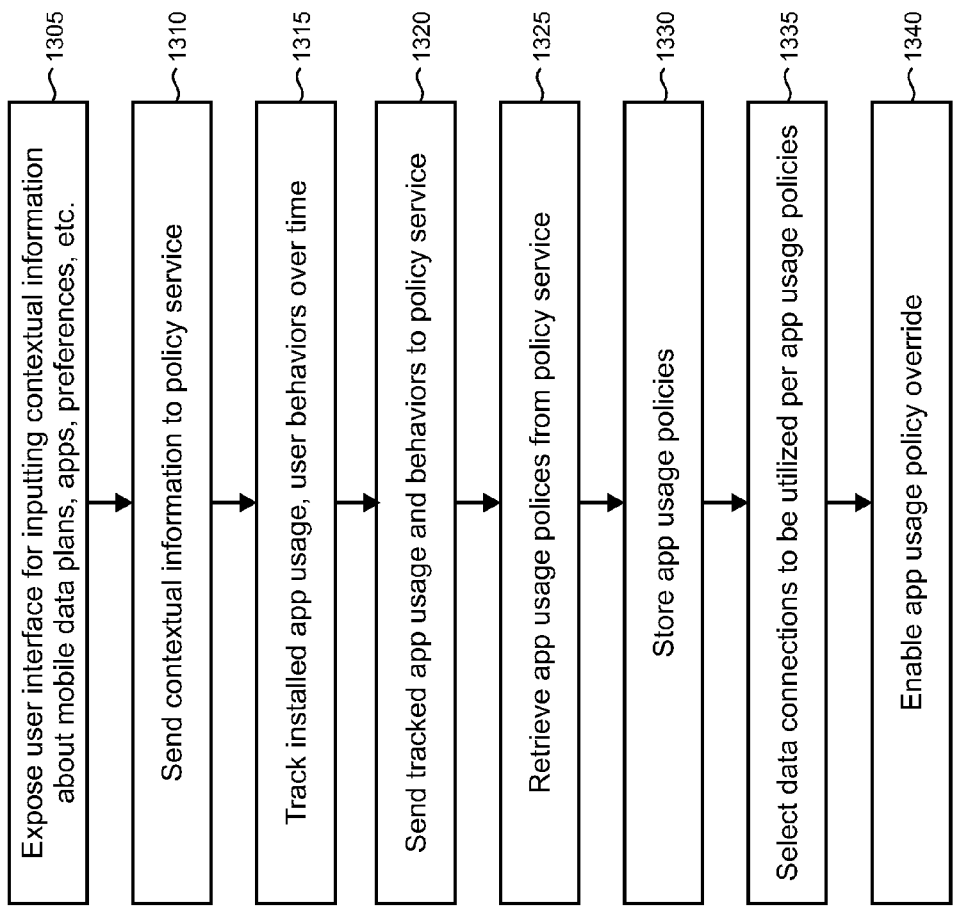
FIG. 13 is a flowchart of an illustrative method utilized by a mobile device in an automatic implementation of app usage policies.

FIG. 13 shows an illustrative method 1300 that may be utilized at a mobile device 110 (FIG. 1) as part of the automatic implementation of the app usage policies 710 (FIG. 7). In step 1305, the UI 630 (FIG. 6) is exposed to a user of the mobile device 110. The UI is configured to enable the user to provide some contextual information about one or more of the installed apps on the mobile device, the mobile data plans (e.g., data limits, plan policies, identities associated with plans, etc.), user preferences, whether the user has other mobile devices of different types (e.g., the user has both a smartphone and a tablet), and other information (e.g., applicable enterprise policies). The contextual information is provided to the policy service 150 (FIG. 1) in step 1310. Steps 1305 and 1310 are generally not utilized in the automatic implementation but may be optionally utilized in some scenarios.

In step 1315, installed app usage, and in some cases user behaviors with respect to the apps, is tracked over a time interval. As noted above, such tracking is typically performed subject to notice to the user and the user's consent. The tracked usage and/or behaviors are provided to the policy service 150 in step 1320. The tracked information is used by the policy service to generate app usage policies that are tailored to the user's needs and optimize data connection selection to optimize one or more of user experience, app performance, or costs. During an initial time interval in which tracking is performed, some default app usage policies can be utilized and applied until the tailored policies are provided by the policy service 150 to the mobile device 110. For example, the default policies could be pre-installed at the time the mobile device is shipped, installed at a retail store when the mobile device is purchased, loaded by an administrator in an enterprise scenario, or downloaded to the mobile device when it is initialized on a network.

In step 1325, app usage policies are retrieved from the policy service 150 by the mobile device 110 and ingested. The app usage policies are stored in step 1330. As with the manual and semi-automatic implementations, storage may be implemented in a local memory or store on the mobile device 110, but may also be implemented remotely using a cloud-based store or service. In step 1335, the network usage manager 625 (FIG. 6) applies the app usage policies 710 to select a data connection 705 for an app when the app needs data access. Instances of applications of the app usage policies 710 may be overridden by the user in step 1340.

Figure 14:
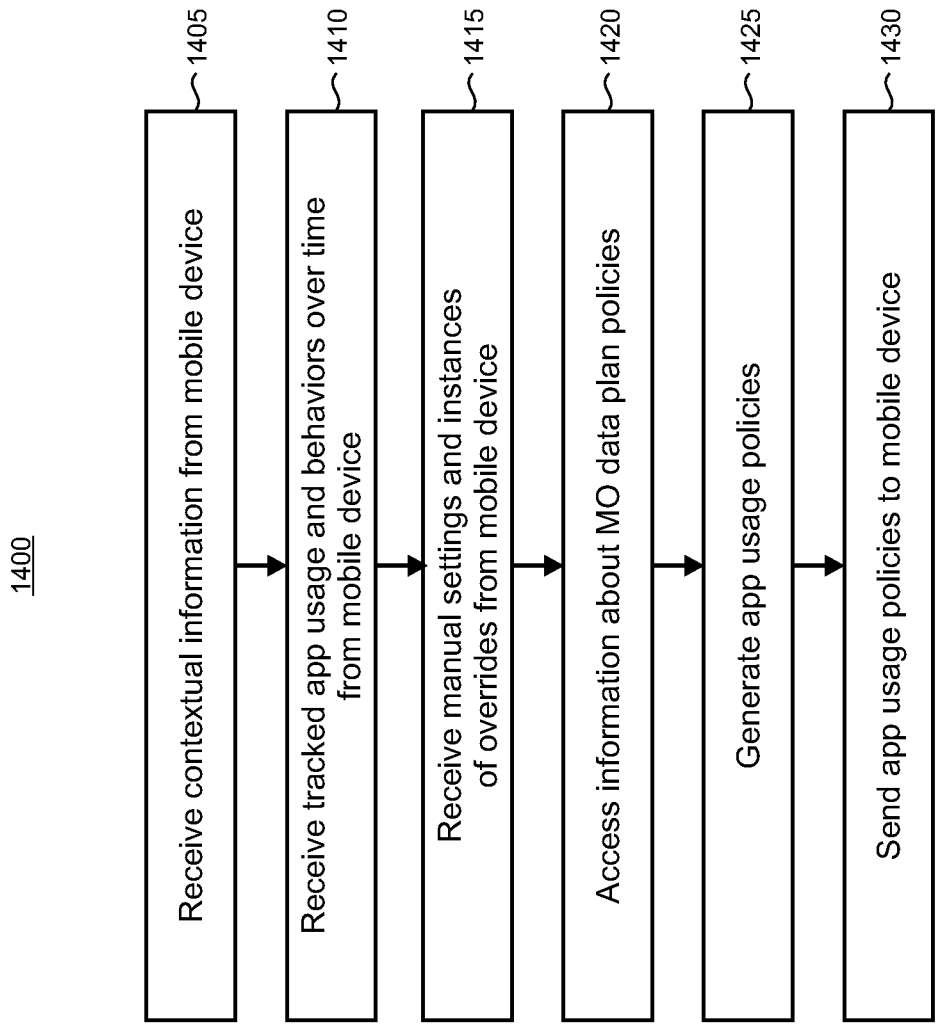
FIG. 14 is a flowchart of an illustrative method utilized by a policy service for generating app usage policies.

FIG. 14 shows an illustrative method 1400 that may be utilized by the policy service 150 (FIG. 1) as part of the semi-automatic and automatic implementations of the app usage policies 710 (FIG. 7). In step 1405, the policy service receives contextual information from the mobile device 110. As noted above, the contextual information can be optionally input by the user and used in the semi-automatic and automatic implementations in some scenarios. In step 1410, the policy service 150 receives information from the mobile device pertaining to the tracked usage of installed apps and, in some cases, user behaviors with respect to the apps and/or other features/services supported on the mobile device. As noted above, such tracked information is typically collected at the mobile device 110 and received by the policy service 150 in the automatic implementation of app usage policies.

In step 1415, the policy service 150 receives manual settings implemented by the user and instances in which overrides were performed from the mobile device 110. The manual settings can be utilized, for example, when the user adjusts or tweaks app usage policy recommendations that are surfaced by the semi-automatic implementation, as described above. Overrides may be performed by the user in each of the manual, semi-automatic, and automatic implementations and may assist the policy service 150 in developing appropriate and performant app usage policies in some situations.

The policy service 150 may access information about specific MO data plans in step 1420. In some cases, and typically with notice to and consent from the user, the policy service 150 can communicate with an MO directly to access information that may be pertinent for developing app usage policies that are tailored to the user. In other cases, the information about data plan policies can be provided by the user as part of the contextual information received by the policy service in step 1405. Alternatively, the policy service 150 may be able to estimate or infer some information about an MO's data plan policies based on the other information it receives from the user and/or mobile device.

The policy service 150 can generate app usage policies 710 taking into account the available data in step 1425.

Various methodologies may be utilized and the data can be weighted in some implementations. The app usage policies may be generated using iterative methods and regenerated periodically as new data becomes available. For example, in both the semi-automatic and automatic implementations, app usage policies can be revised, updated, refreshed, or renewed as the installed apps change or are updated, or the user changes behaviors with regard to given apps. The app usage policies are sent to the mobile device over an MO network in step 1430.

Figure 15:
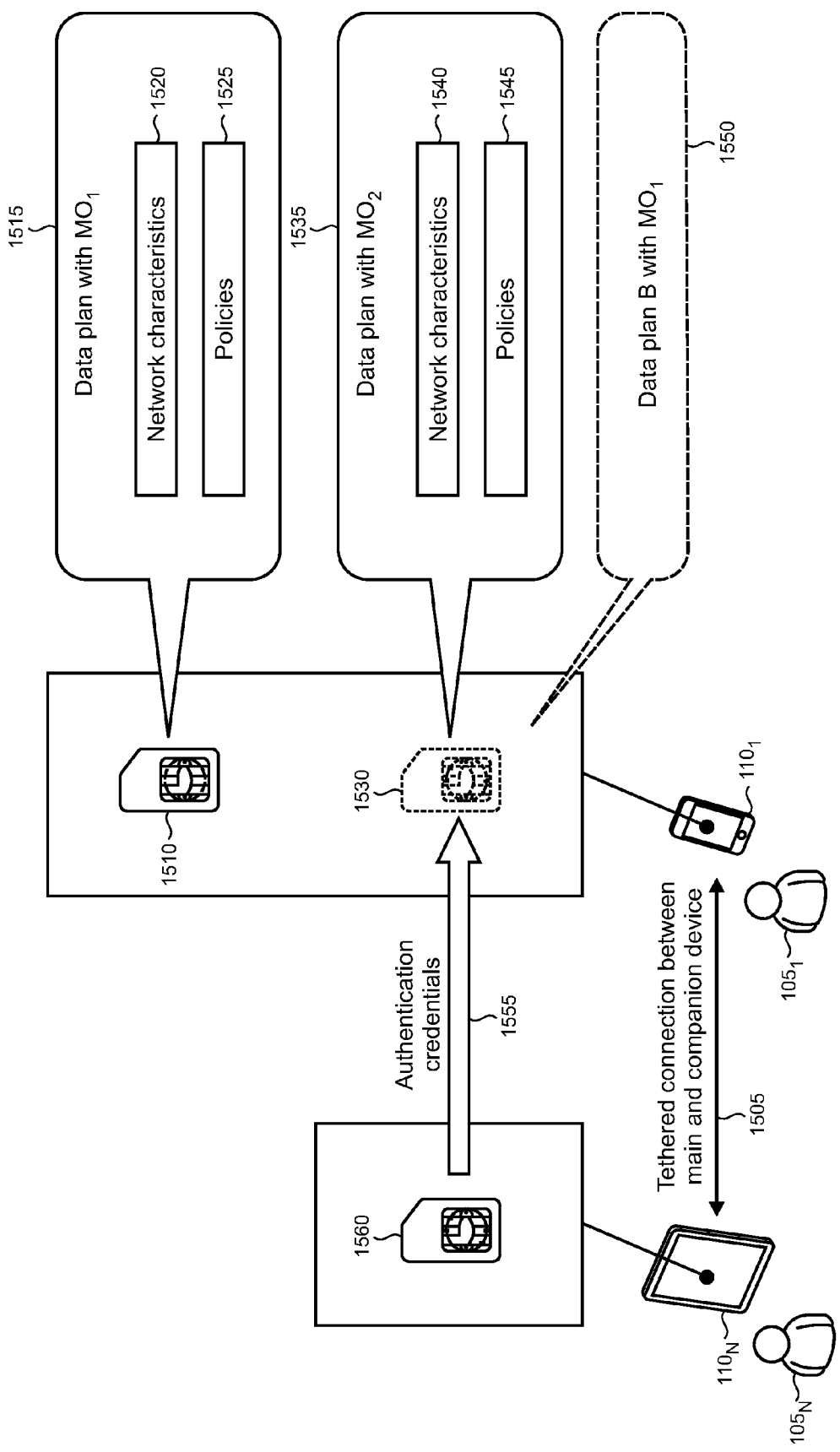
FIG. 15 shows an illustrative arrangement in which a companion device is tethered to a main device having a dummy SIM.

FIG. 15 shows an illustrative arrangement in which a main mobile device $110_1$ is tethered to a companion device $110_N$ as indicated by line 1505. The tether can be implemented in various ways using, for example, physical cables such as Universal Serial Bus (USB) and propriety cables, and wireless connections such as Bluetooth or Wi-Fi. The main mobile device here is equipped with a conventional SIM 1510 that provides a connection with $MO_1$ under a data plan 1515 which has associated network characteristics 1520 and policies 1525. The mobile device also utilizes a virtual SIM 1530 to access $MO_2$ under a data plan 1535 that has associated network characteristics 1540 and policies 1545. In alternative arrangements, the virtual SIM 1530 may be utilized to access a second data plan (i.e., data plan B) with $MO_1$, as indicated by reference numeral 1550.

The virtual SIM 1530 enables authentication credentials 1555 associated with a SIM 1560 installed on the companion device $110_N$ to be utilized by the main mobile device $110_1$ for authorized access to $MO_2$ as an authenticated user. That is, under the arrangement shown in FIG. 15, the main mobile device can essentially "borrow" the authentication credentials from the tethered companion device. However, the main mobile device $110_1$ uses it own cellular stack and transceiver to access $MO_2$. This is different from typical tethering scenarios in which the device providing authentication credentials also provides the needed communication resources. In addition to real (i.e., conventional) and virtual SIMs, other types of SIMs (in various combinations and sub-combinations with real and virtual SIMs) may also be utilized to meet the needs of a specific implementation including embedded SIMs and devices/components that implement one or more SIM functionalities using software code (i.e., "soft" SIMs).

The network usage manager 625 (FIG. 6) is arranged to operate on the main mobile device $110_1$. The network usage manager can apply app usage policies, as described above, to select between data connections supported by the data plan 1515 associated with SIM 1510 and the data plan 1535 (or data plan 1550) associated with the virtual SIM 1530.

Figure 16:
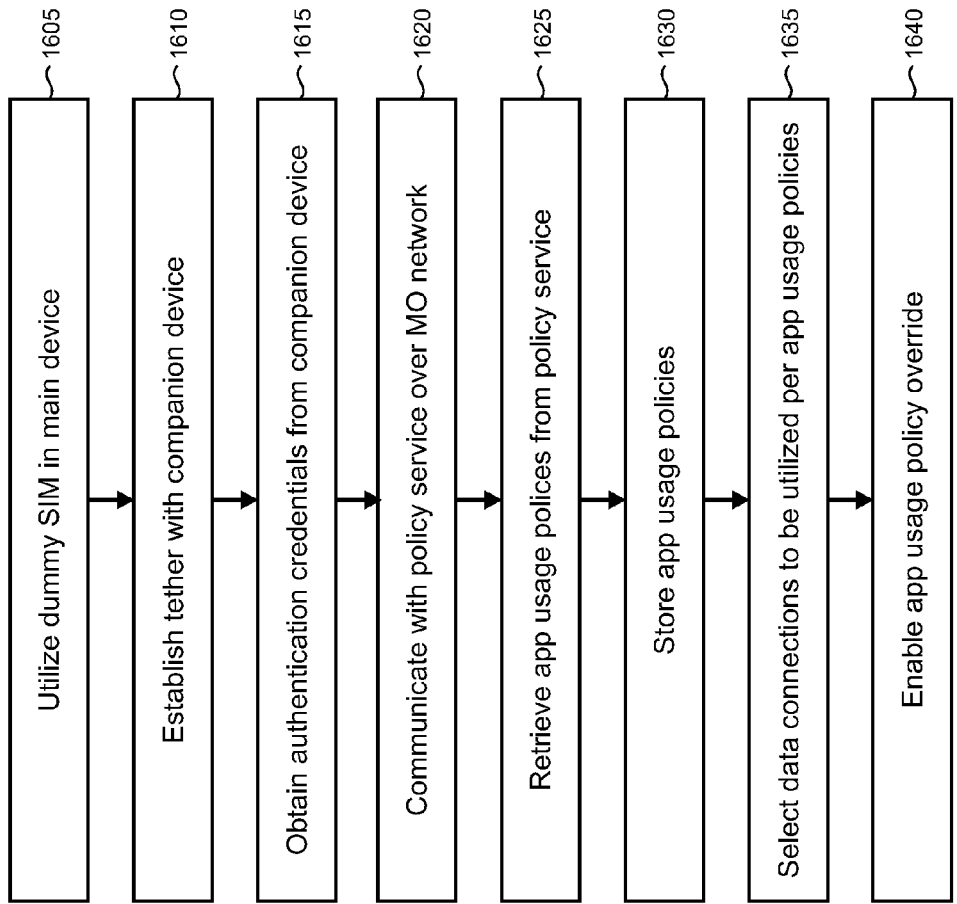
FIG. 16 is a flowchart of an illustrative method utilized by a mobile device for accessing an MO network using authentication credentials provided by a tethered companion device.

FIG. 16 shows an illustrative method 1600 that may be utilized at the main mobile device using a virtual SIM in a tethering scenario with a companion device. In step 1605, a virtual SIM is utilized in the main mobile device. In step 1610, a tether is established between the main and companion devices, using for example, a cable or wireless connection. In step 1615, authentication credentials are obtained by the main mobile device from the companion device. In some cases, for example those using the semi-automatic and automatic implementations, the main mobile device will communicate over an MO network with contextual information and tracked app usage and user behaviors in step 1620. Such communication could be implemented over networks associated with either the SIM 1510 (FIG. 15) or the virtual SIM 1530. However, as communications with the policy service are generally background processes, they will typically be implemented using a slow/low QoS connection.

In step 1625, app usage policies are retrieved from the policy service 150 by the main mobile device $110_1$ and ingested. In step 1630, the retrieved app usage policies can be exposed to the user through the UI 630 as recommendations or default settings in semi-automatic implementations for which the user can manually adjust or override them as desired. The app usage policies can be stored in a local memory or store on the mobile device 110, and also be stored remotely using a cloud-based store or service. In step 1635, the network usage manager 625 (FIG. 6) applies the app usage policies 710 to select a data connection 705 for an app when the app needs data access. The app usage policies 710 may be overridden by the user in step 1640.

Figure 17:
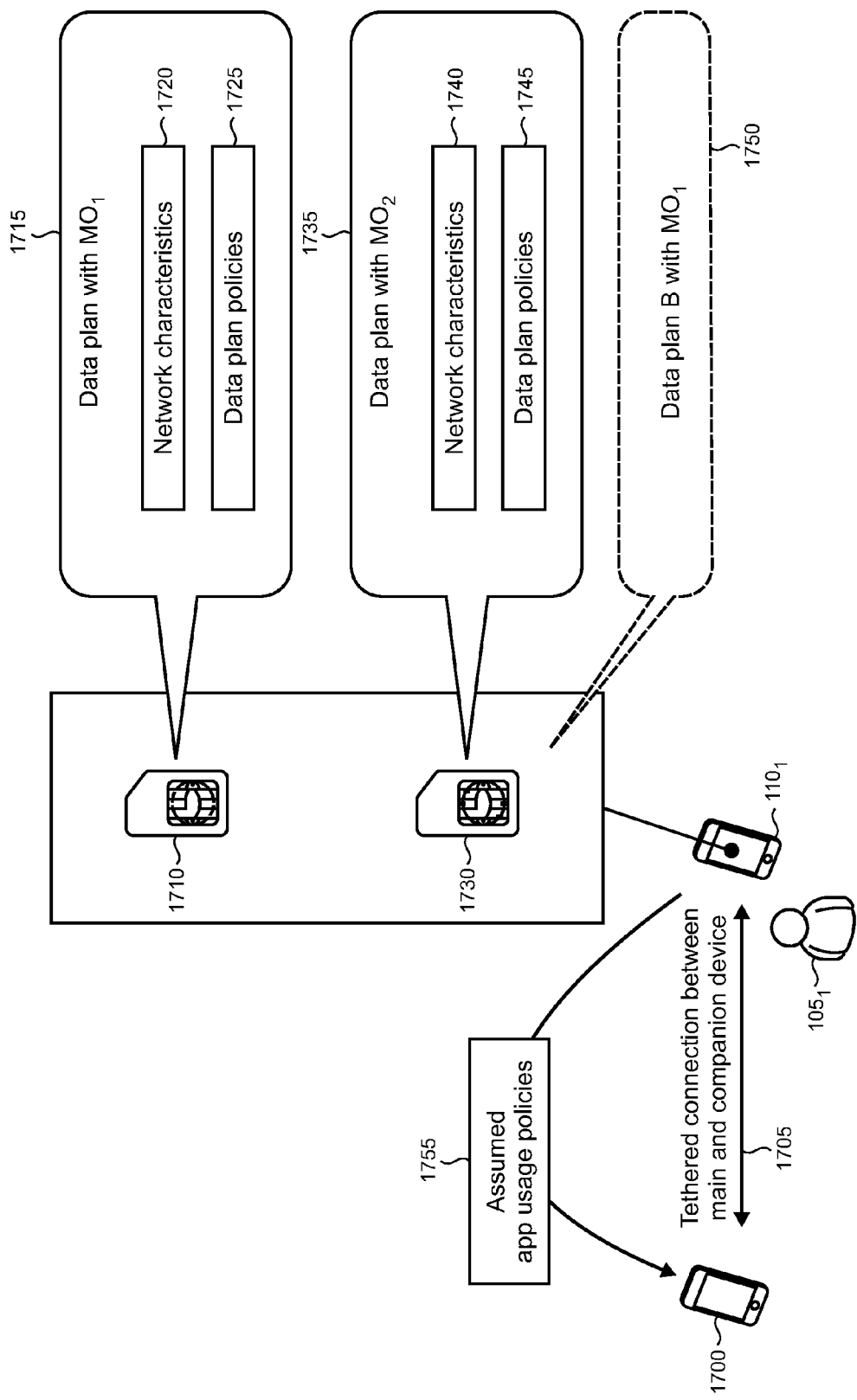
FIG. 17 shows an illustrative arrangement in which a companion device assumes app usage policies from a tethered main device.

FIG. 17 shows an illustrative arrangement in which a main mobile device $110_1$ is tethered to a companion device 1700 as indicated by line 1705. The tether can be implemented in various ways using, for example, physical cables such as Universal Serial Bus (USB) and propriety cables, and wireless connections such as Bluetooth or Wi-Fi. The main mobile device supports multiple data connections using a SIM 1710 that provides a connection with $MO_1$ under a data plan 1715 which has associated network characteristics 1720 and policies 1725 and a SIM 1730 to access $MO_2$ under a data plan 1735 that has associated network characteristics 1740 and policies 1745. In alternative arrangements, the SIM 1730 may be utilized to access a second data plan (i.e., data plan B) with $MO_1$, as indicated by reference numeral 1750. Multiple data connections may also be supported with a single MO using a single SIM in some arrangements (not shown).

In this particular illustrative example, the companion device 1700 does not have its own capabilities to access mobile data (however, in alternative scenarios, the companion device could maintain its own independent capabilities). For example, the companion device might not have cellular communication capabilities at all, or the device is associated with an MO for which no service is presently available, or the user simply prefers to use the data connections afforded by the main mobile device. Thus, companion device 1700 is relying on the tether to the main device $110_1$ to obtain access to data services. Thus, from the perspective of the companion device, the tether is somewhat more conventional than with the arrangement shown in FIG. 15 and described in the accompanying text.

The companion device 1700 supports various data-consuming apps and includes a network usage manager (not shown). Instead of obtaining and locally storing its own app usage policies which the network usage manager applies, it assumes the app usage policies from the main mobile device $110_1$ as indicated by reference numeral 1755. As apps execute on the companion device 1700 and need to access data, the network usage manager on the companion device will apply the assumed app usage policies 1755 to select between the data connections supported by the main mobile device $110_1$.

Figure 18:
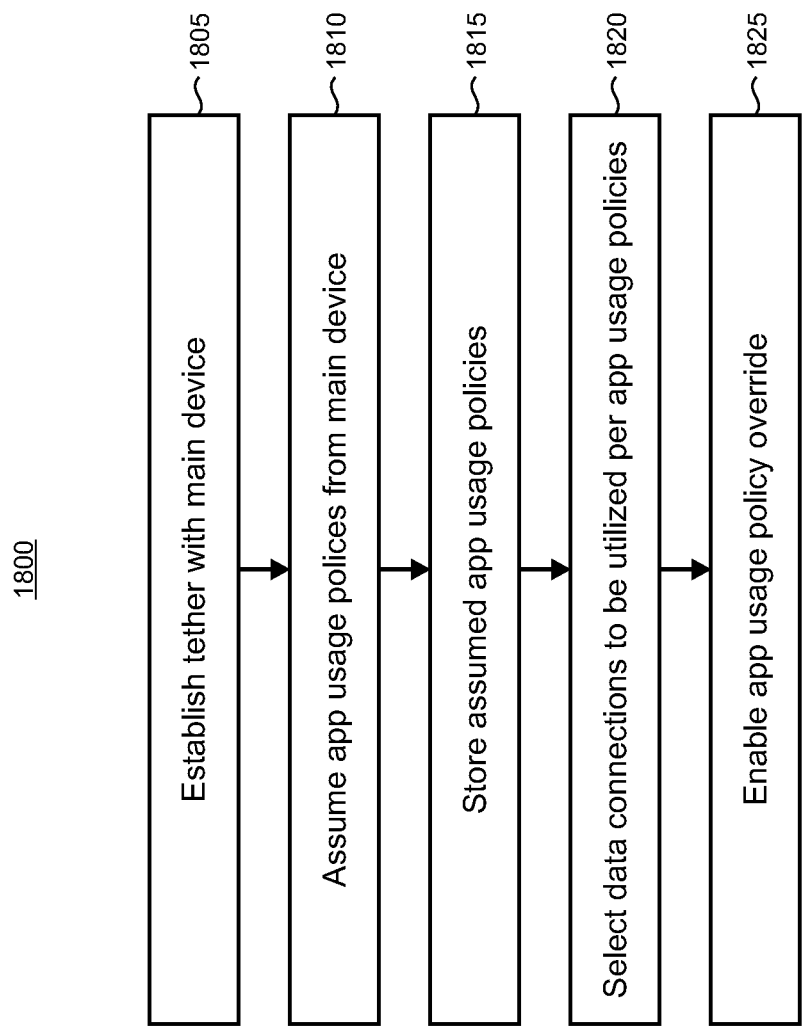
FIG. 18 is a flowchart of an illustrative method utilized by a companion device using assumed app usage policies from a tethered main device.

FIG. 18 shows an illustrative method 1800 that may be utilized at the companion device 1700 (FIG. 17) in a tethering scenario with the main mobile device $110_1$ that supports multiple data connections. In step 1805, a tether is established between the companion and main devices using, for example, a cable or wireless connection. The companion device 1700 assumes the app usage policies from the main mobile device $110_1$ in step 1810. The assumed app usage policies are locally stored on the companion device in typical applications in step 1815 although they may alternatively be kept on the main mobile device or remotely stored.

In step 1820, a network usage manager running on the companion device applies the app usage policies 710 to select a data connection from the data connections available to the main mobile device for an app when the app needs data access. In alternative implementations, the network usage manager running on the main mobile device $110_1$ can be configured to act on behalf of the companion device 1700 and apply the assumed app usage policies to data access requests from apps running on the companion device. Instances of application of the app usage policies 710 may be overridden by the user in step 1825.

Figure 19:
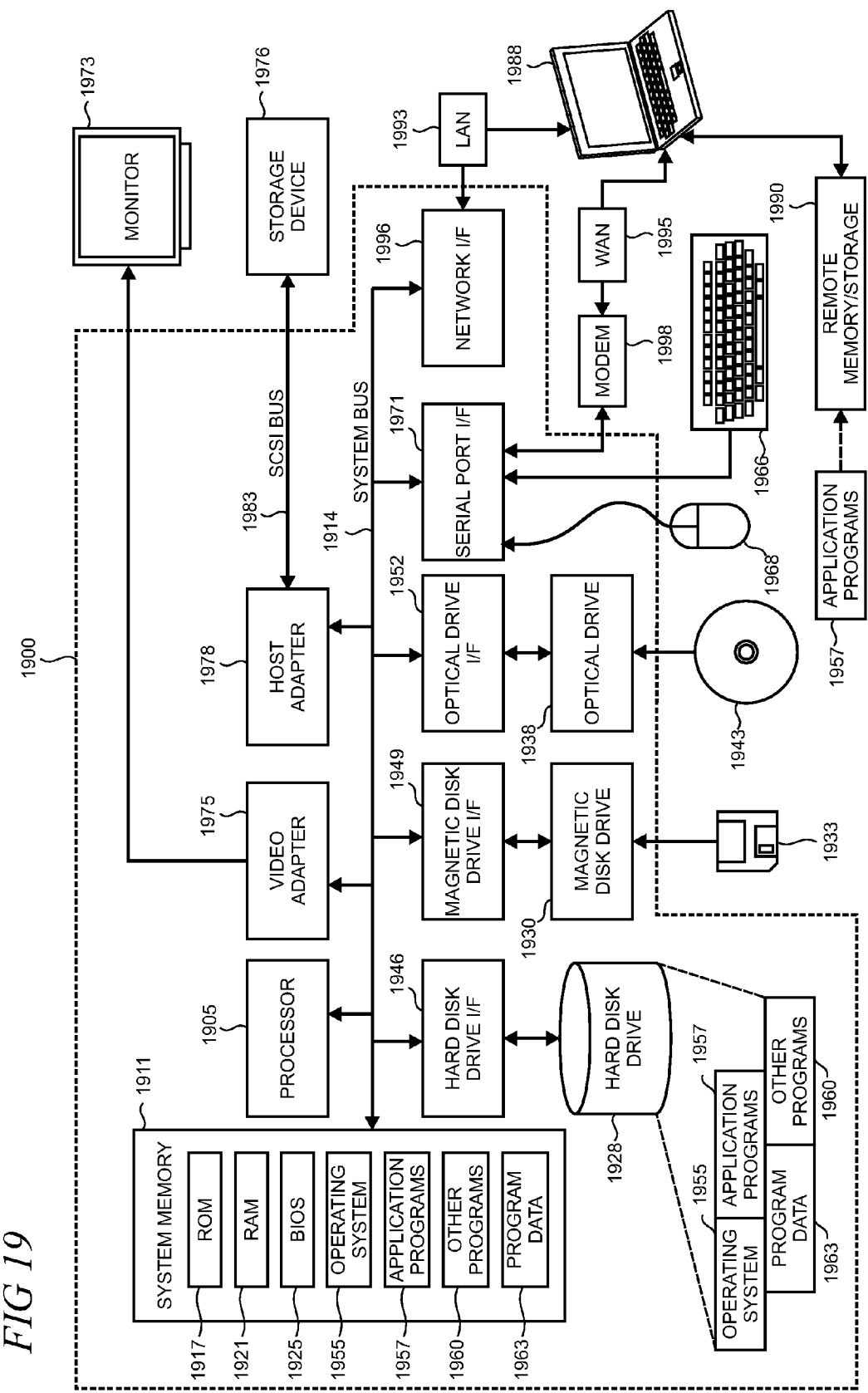
FIG. 19 is a simplified block diagram of an illustrative computer system such as a personal computer (PC) that may be used in part to implement the present network selection for a given app or context.

FIG. 19 is a simplified block diagram of an illustrative computer system 1900 such as a personal computer (PC), client machine, or server with which network selection for a given app or context may be implemented. Computer system 1900 includes a processor 1905, a system memory 1911, and a system bus 1914 that couples various system components including the system memory 1911 to the processor 1905. The system bus 1914 may be any of several types of bus structures including a memory bus or memory controller, a peripheral bus, or a local bus using any of a variety of bus architectures. The system memory 1911 includes read only memory (ROM) 1917 and random access memory (RAM) 1921. A basic input/output system (BIOS) 1925, containing the basic routines that help to transfer information between elements within the computer system 1900, such as during startup, is stored in ROM 1917. The computer system 1900 may further include a hard disk drive 1928 for reading from and writing to an internally disposed hard disk (not shown), a magnetic disk drive 1930 for reading from or writing to a removable magnetic disk 1933 (e.g., a floppy disk), and an optical disk drive 1938 for reading from or writing to a removable optical disk 1943 such as a CD (compact disc), DVD (digital versatile disc), or other optical media. The hard disk drive 1928, magnetic disk drive 1930, and optical disk drive 1938 are connected to the system bus 1914 by a hard disk drive interface 1946, a magnetic disk drive interface 1949, and an optical drive interface 1952, respectively. The drives and their associated computer-readable storage media provide non-volatile storage of computer-readable instructions, data structures, program modules, and other data for the computer system 1900. Although this illustrative example includes a hard disk, a removable magnetic disk 1933, and a removable optical disk 1943, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present network selection for a given app or context. In addition, as used herein, the term computer-readable storage media includes one or more instances of a media type (e.g., one or more magnetic disks, one or more CDs, etc.). For purposes of this specification and the claims, the phrase "computer-readable storage media," and variations thereof, does not include waves, signals, and/or other transitory and/or intangible communication media.

A number of program modules may be stored on the hard disk 1928, magnetic disk 1933, optical disk 1943, ROM 1917, or RAM 1921, including an operating system 1955, one or more application programs 1957, other program modules 1960, and program data 1963. A user may enter commands and information into the computer system 1900 through input devices such as a keyboard 1966 and pointing device 1968 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 1905 through a serial port interface 1971 that is coupled to the system bus 1914, but may be connected by other interfaces, such as a parallel port, game port, or universal serial bus (USB). A monitor 1973 or other type of display device is also connected to the system bus 1914 via an interface, such as a video adapter 1975. In addition to the monitor 1973, personal computers typically include other peripheral output devices (not shown), such as speakers and printers. The illustrative example shown in FIG. 19 also includes a host adapter 1978, a Small Computer System Interface (SCSI) bus 1983, and an external storage device 1976 connected to the SCSI bus 1983.

The computer system 1900 is operable in a networked environment using logical connections to one or more remote computers, such as a remote computer 1988. The remote computer 1988 may be selected as another personal computer, a server, a router, a network PC, a peer device, or other common network node, and typically includes many or all of the elements described above relative to the computer system 1900, although only a single representative remote memory/storage device 1990 is shown in FIG. 19. The logical connections depicted in FIG. 19 include a local area network (LAN) 1993 and a wide area network (WAN) 1995. Such networking environments are often deployed, for example, in offices, enterprise-wide computer networks, intranets, and the Internet.

When used in a LAN networking environment, the computer system 1900 is connected to the local area network 1993 through a network interface or adapter 1996. When used in a WAN networking environment, the computer system 1900 typically includes a broadband modem 1998, network gateway, or other means for establishing communications over the wide area network 1995, such as the Internet. The broadband modem 1998, which may be internal or external, is connected to the system bus 1914 via a serial port interface 1971. In a networked environment, program modules related to the computer system 1900, or portions thereof, may be stored in the remote memory storage device 1990. It is noted that the network connections shown in FIG. 19 are illustrative and other means of establishing a communications link between the computers may be used depending on the specific requirements of an application of the present network selection for a given app or context.

Figure 20:
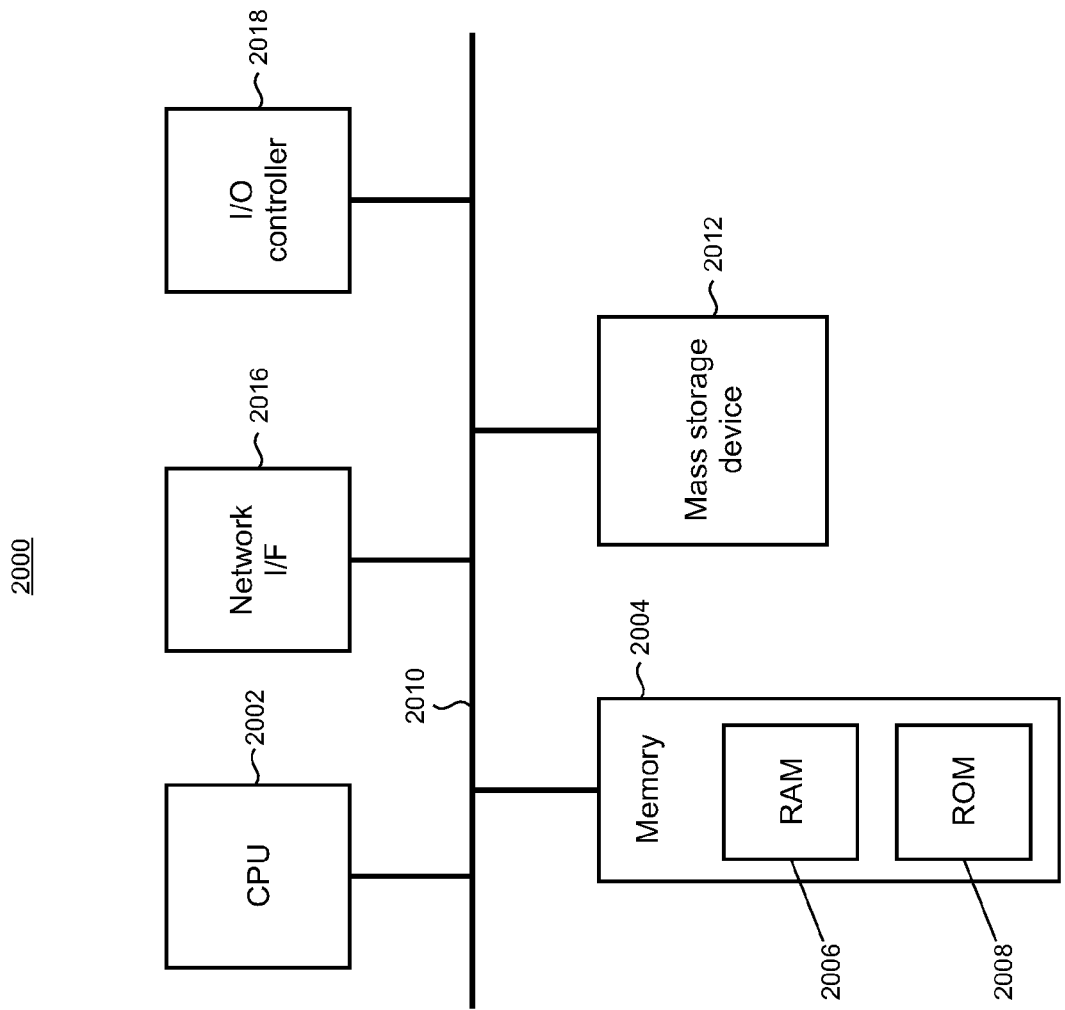
FIG. 20 shows a block diagram of an illustrative computing platform that may be used in part to implement the present network selection for a given app or context.

FIG. 20 shows an illustrative architecture 2000 for a device capable of executing the various components described herein for providing the present network selection for a given app or context. Thus, the architecture 2000 illustrated in FIG. 20 shows an architecture that may be adapted for a server computer, mobile phone, a PDA, a smartphone, a desktop computer, a netbook computer, a tablet computer, GPS device, gaming console, and/or a laptop computer. The architecture 2000 may be utilized to execute any aspect of the components presented herein.

The architecture 2000 illustrated in FIG. 20 includes a CPU 2002, a system memory 2004, including a RAM 2006 and a ROM 2008, and a system bus 2010 that couples the memory 2004 to the CPU 2002. A basic input/output system containing the basic routines that help to transfer information between elements within the architecture 2000, such as during startup, is stored in the ROM 2008. The architecture 2000 further includes a mass storage device 2012 for storing software code or other computer-executed code that is utilized to implement applications, the file system, and the operating system.

The mass storage device 2012 is connected to the CPU 2002 through a mass storage controller (not shown) connected to the bus 2010. The mass storage device 2012 and its associated computer-readable storage media provide non-volatile storage for the architecture 2000.

Although the description of computer-readable storage media contained herein refers to a mass storage device, such as a hard disk or CD-ROM drive, it should be appreciated by those skilled in the art that computer-readable storage media can be any available storage media that can be accessed by the architecture 2000.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2000.

According to various embodiments, the architecture 2000 may operate in a networked environment using logical connections to remote computers through a network. The architecture 2000 may connect to the network through a network interface unit 2016 connected to the bus 2010. It should be appreciated that the network interface unit 2016 also may be utilized to connect to other types of networks and remote computer systems. The architecture 2000 also may include an input/output controller 2018 for receiving and processing input from a number of other devices, including a keyboard, mouse, or electronic stylus (not shown in FIG. 20). Similarly, the input/output controller 2018 may provide output to a display screen, a printer, or other type of output device (also not shown in FIG. 20).

It should be appreciated that the software components described herein may, when loaded into the CPU 2002 and executed, transform the CPU 2002 and the overall architecture 2000 from a general-purpose computing system into a special-purpose computing system customized to facilitate the functionality presented herein. The CPU 2002 may be constructed from any number of transistors or other discrete circuit elements, which may individually or collectively assume any number of states. More specifically, the CPU 2002 may operate as a finite-state machine, in response to executable instructions contained within the software modules disclosed herein. These computer-executable instructions may transform the CPU 2002 by specifying how the CPU 2002 transitions between states, thereby transforming the transistors or other discrete hardware elements constituting the CPU 2002.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 2000 in order to store and execute the software components presented herein. It also should be appreciated that the architecture 2000 may include other types of computing devices, including handheld computers, embedded computer systems, smartphones, PDAs, and other types of computing devices known to those skilled in the art. It is also contemplated that the architecture 2000 may not include all of the components shown in FIG. 20, may include other components that are not explicitly shown in FIG. 20, or may utilize an architecture completely different from that shown in FIG. 20.

Figure 21:
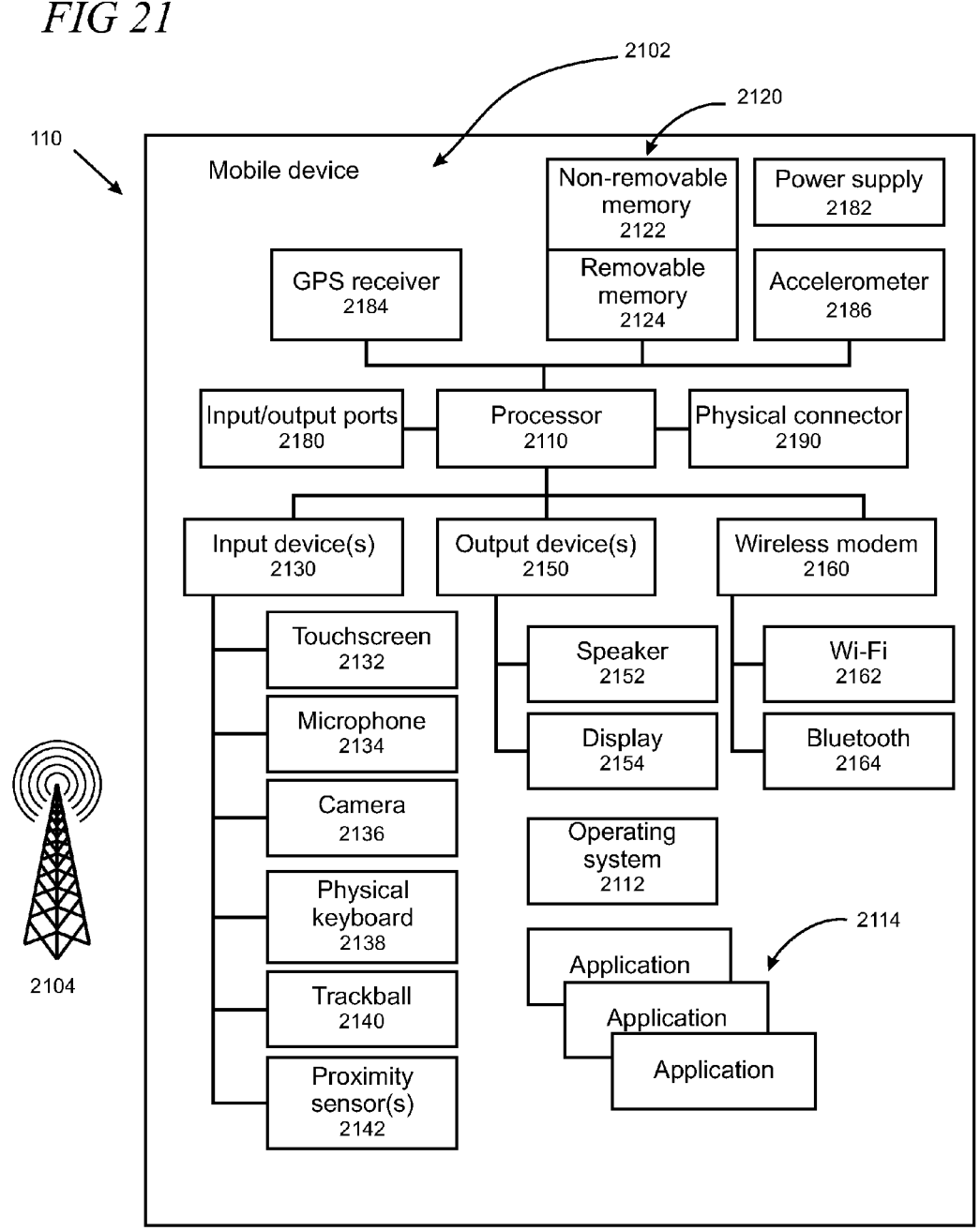
FIG. 21 is a block diagram of an illustrative mobile device.

FIG. 21 is a functional block diagram of an illustrative mobile device 110 such as a mobile phone or smartphone including a variety of optional hardware and software components, shown generally at 2102. Any component 2102 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 2104, such as a cellular or satellite network.

The illustrated mobile device 110 can include a controller or processor 2110 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2112 can control the allocation and usage of the components 2102, including power states, above-lock states, and below-lock states, and provides support for one or more application programs 2114. The application programs can include common mobile computing applications (e.g., image-capture applications, email applications, calendars, contact managers, web browsers, messaging applications), or any other computing application.

The illustrated mobile device 110 can include memory 2120. Memory 2120 can include non-removable memory 2122 and/or removable memory 2124. The non-removable memory 2122 can include RAM, ROM, Flash memory, a hard disk, or other well-known memory storage technologies. The removable memory 2124 can include Flash memory or a SIM, which is well known in GSM (Global System for Mobile communications) systems, or other well-known memory storage technologies, such as "smart cards." The memory 2120 can be used for storing data and/or code for running the operating system 2112 and the application programs 2114. Example data can include web pages, text, images, sound files, video data, or other data sets to be sent to and/or received from one or more network servers or other devices via one or more wired or wireless networks.

The memory 2120 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the mobile device 110.

The memory 2120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 110 can support one or more input devices 2130; such as a touch screen 2132; microphone 2134 for implementation of voice input for voice recognition, voice commands, and the like; camera 2136; physical keyboard 2138; trackball 2140; and/or proximity sensor 2142; and one or more output devices 2150, such as a speaker 2152 and one or more displays 2154. Other input devices (not shown) using gesture recognition may also be utilized in some cases. Other possible output devices (not shown) can include piezoelectric or haptic output devices. Some devices can serve more than one input/output function. For example, touchscreen 2132 and display 2154 can be combined into a single input/output device.

A wireless modem 2160 can be coupled to an antenna (not shown) and can support two-way communications between the processor 2110 and external devices, as is well understood in the art. The modem 2160 is shown generically and can include a cellular modem for communicating with the mobile communication network 2104 and/or other radio-based modems (e.g., Bluetooth 2164 or Wi-Fi 2162). The wireless modem 2160 is typically configured for communication with one or more cellular networks, such as a GSM network for data and voice communications within a single cellular network, between cellular networks, or between the mobile device and a public switched telephone network (PSTN).

The mobile device can further include at least one input/output port 2180, a power supply 2182, a satellite navigation system receiver 2184, such as a GPS receiver, an accelerometer 2186, a gyroscope (not shown), and/or a physical connector 2190, which can be a USB port, IEEE 1394 (FireWire) port, and/or an RS-232 port. The illustrated components 2102 are not required or all-inclusive, as any components can be deleted and other components can be added.

Based on the foregoing, it should be appreciated that technologies for network selection for a given app or context have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method performed on a mobile device, comprising:
providing a user interface (UI), the UI being configured for setting application usage policies, the application usage policies determining which one of multiple mobile data connections to one or more mobile operator (MO) networks available to the mobile device is utilized for mobile data access by an application executing at least in part on the mobile device, wherein the application usage policies are applicable to categories of applications executing at least in part on the mobile device;
storing the application usage policies with a user-configured setting;
placing applications installed in the mobile device into the categories;
selecting a mobile data connection from the multiple mobile data connections to one or more mobile operator (MO) networks available to the mobile device according to the stored application usage policy and mapping the selected mobile data connection to the application, the selected mobile data connection being utilized by the application for mobile data access; and
configuring the UI to allow a user to override the selection of a mobile data connection, selected for an application according to the stored usage policy, the overriding being performed on a single instance of mobile data access by the application or the overriding being persisted to subsequent instances of mobile data access by the application.

2. The method of claim 1 further including storing at least a portion of the set application policy usage in one of a local store on the mobile device or a cloud-based store.

3. The method of claim 1 in which the categories include at least one of background application, foreground application, personal application, or enterprise application, and the multiple mobile data connections are implemented using one or more of cellular protocols or Wi-Fi protocols using one or more SIM (Subscriber Identity Module).

4. The method of claim 1 in which each of multiple mobile data connections are respectively associated with data plans having network characteristics and policies, and in which the setting is performed according to MO or time of day, or the setting is performed according to one or more network characteristics or policies, the network characteristics including one or more of speed, quality of service, type under 3GPP, network capacity, or congestion, the policies including one or more of data allotments, data limits, or data plan costs.

5. The method of claim 1 further including configuring the UI for setting the application usage policy according to one or more job-related enterprise policies.

6. The method of claim 1 wherein a mobile data connection to a single mobile operator network includes either:
   a plurality of SIM, each SIM supporting a data connection to a separate subscriber account with the single mobile operator network, or
   a single SIM that supports a data connection with the single mobile operator network having a plurality of data plans each data plan having its own network characteristics.

7. A mobile device supporting multiple mobile data connections with at least one mobile operator (MO) network, comprising:
   one or more processors;
   a display that supports a user interface (UI) for interacting with a user of the mobile device; and
   a memory device storing computer-readable instructions which, when executed by the one or more processors, cause the mobile device to:
      implement a network usage manager configured for applying an application usage policy that specifies which one of multiple mobile data connections available to the mobile device is utilized for mobile data access by an application executing at least in part on the mobile device,
      retrieve a plurality of application usage policies from a remote policy service,
      show the retrieved plurality of application usage policies on the UI,
      configure the UI to enable one or more of the plurality of retrieved application usage policies to be set manually,
      configure the UI to enable installed applications to be categorized by type, the categorized applications using a selected mobile data connection according to one or more application usage policies retrieved from the policy service;
      place applications installed in the mobile device into the categories;
      apply the retrieved application usage policy to select a mobile data connection from the multiple mobile data connections specified therein, the selected mobile data connection being utilized by a category of applications for mobile data access.

8. The mobile device of claim 7 wherein the memory device storing computer-readable instructions further causes the mobile device to:
   configure the UI to enable inputting data for one of identification of installed application, user preferences, information pertaining to a mobile data plan associated with a mobile data connection, or contextual information, and send the input data to the remote policy service.

9. The mobile device of claim 7 wherein the memory device storing computer-readable instructions further causes the mobile device to track usage of installed applications on the mobile device and send the tracked usage to the policy service.

10. The mobile device of claim 7 wherein the memory device storing computer-readable instructions further causes the mobile device to track user behaviors during interacting with installed applications on the mobile device and sending the tracked user behaviors to the policy service.

11. The mobile device of claim 7 in which the multiple data connections are supported by a plurality of Subscriber Identity Modules (SIMs) or a single SIM.

12. The mobile device of claim 11 in which the mobile device utilizes at least one of virtual, embedded, or soft SIM and the mobile device is tethered to a companion device and the mobile device uses authentication credentials provided by the companion device for data access to an MO network.

13. The mobile device of claim 11 in which the mobile device is tethered to a companion device and the companion device assumes application usage policies that are stored on the mobile device, the companion device applying the assumed application usage policies for applications executing at least in part thereon when accessing mobile data.

14. One or more computer-readable storage media storing instructions which, when executed by one or more processors, perform a method for generating and providing application usage policies to a mobile device comprising:
   receiving data from the mobile device pertaining to usage of applications installed on the mobile device;
   generating application usage policies using the received data, the application usage policies determining which one of multiple mobile data connections to one or more networks available to the mobile device is utilized for mobile data access by an application executing at least in part on the mobile device;
   sending the application usage policies to the mobile device over a network;
   receiving information from the mobile device pertaining to instances in which an applied application usage policy is overridden, generating updated application usage policies based at least in part on the received information, and sending the updated application usage policies to the mobile device over the network;
   obtaining information about mobile data plan policies associated with one or more subscriber identity modules (SIMs) installed on the mobile device;
   generating updated application usage policies based at least in part on the obtained information; and
   sending the updated application usage policies to the mobile device over the network in which the networks include one of Wi-Fi network or mobile operator network and the SIMs include one of real SIM, virtual SIM, embedded SIM, or soft SIM.

15. The one or more computer-readable storage media of claim 14 further including receiving contextual information from the mobile device, generating either the application usage policies or the updated application usage policies based at least in part on the received contextual information, the contextual information including one or more of identification of installed applications on the mobile device, user preferences, information pertaining to mobile data plans associated with one or more subscriber identity modules (SIMs) installed on the mobile device, or enterprise policies.

* * * * *